US012697616B2

(12) United States Patent
Henry et al.

(10) Patent No.: US 12,697,616 B2
(45) Date of Patent: Aug. 4, 2026

(54) FLOW CONTROL IN MICROFLUIDIC DEVICES

(71) Applicant: Colorado State University Research Foundation, Fort Collins, CO (US)

(72) Inventors: Charles S. Henry, Fort Collins, CO (US); Ilhoon Jang, Seoul (KR)

(73) Assignee: Colorado State University Research Foundation, Fort Collins, CO (US)

(*) Notice: Subject to any disclaimer, the term of this patent is extended or adjusted under 35 U.S.C. 154(b) by 687 days.

(21) Appl. No.: 18/042,113

(22) PCT Filed: Aug. 19, 2021

(86) PCT No.: PCT/US2021/071231
§ 371 (c)(1),
(2) Date: Feb. 17, 2023

(87) PCT Pub. No.: WO2022/040690
PCT Pub. Date: Feb. 24, 2022

(65) Prior Publication Data

US 2023/0311123 A1 Oct. 5, 2023

Related U.S. Application Data

(60) Provisional application No. 63/171,989, filed on Apr. 7, 2021, provisional application No. 63/068,842, filed on Aug. 21, 2020.

(51) Int. Cl.
*B01L 3/00* (2006.01)

(52) U.S. Cl.
CPC ... *B01L 3/502738* (2013.01); *B01L 3/502776* (2013.01); *B01L 2200/0621* (2013.01); *B01L 2400/0481* (2013.01)

(58) Field of Classification Search
CPC ......... B01L 3/502738; B01L 3/502776; B01L 2200/0621; B01L 2400/0481;
(Continued)

(56) References Cited

U.S. PATENT DOCUMENTS 7,004,184 B2 * 2/2006 Handique ............ B01J 19/0093 137/1
2003/0070677 A1 * 4/2003 Handique ............ B01L 3/5027 128/203.12
(Continued)

FOREIGN PATENT DOCUMENTS

WO 2019240764 A1 12/2019

OTHER PUBLICATIONS

International Search Report and Written Opinion, PCT/US2021/071231, dated Nov. 30, 2021.

*Primary Examiner* — John McGuirk
(74) *Attorney, Agent, or Firm* — Berg Hill Greenleaf Ruscitti LLP

(57) ABSTRACT

A microfluidic device includes a device body defining a microfluidic pathway including a first channel, a second channel downstream of the first channel, and a junction including a transition between the first channel and the second channel. The transition is configured to inhibit fluid entering the transition from the first channel from forming a meniscus across the second channel, thereby inhibiting capillary-driven flow into the second channel. The microfluidic device further includes a valve that, when activated while capillary-driven flow of the fluid is inhibited at the transition, induces capillary-driven flow through the second channel by facilitating formation of the meniscus.

10 Claims, 22 Drawing Sheets

(58) Field of Classification Search
CPC ..... B01L 2200/0636; B01L 2300/0816; B01L 2300/0867; B01L 2300/087; B01L 2300/123; B01L 2400/0406; B01L 2400/086; B01L 3/50273; F16K 99/0017
See application file for complete search history.

(56) References Cited

U.S. PATENT DOCUMENTS

| | | | |
|---|---|---|---|
| 2005/0118070 | A1 | 6/2005 | Griss et al. |
| 2013/0121893 | A1 | 5/2013 | Delamarche et al. |
| 2013/0142708 | A1 | 6/2013 | Battrell et al. |
| 2015/0040999 | A1 | 2/2015 | Vulto et al. |
| 2020/0124207 | A1 * | 4/2020 | Kornilovich ...... B01L 3/502738 |

* cited by examiner

2400

| | CONCENTRATION (wt%) | VISCOSITY (cP) | | CONCENTRATION (mM) | SURFACE TENSION (mN/m) |
|---|---|---|---|---|---|
| GLYCERIN | 0 | 0.892 | SDS | 0 | 72 |
| | 10 | 1.14 | | 2.44 | 60 |
| | 20 | 1.52 | | 4.8 | 50 |

FIG. 24

2500

| FLOW RATE ($mm^3/s$) | | SDS CONCENTRATION (mM) | | |
|---|---|---|---|---|
| | | 0 | 2.44 | 4.8 |
| GLYCERIN CONCENTRATION (wt%) | 0 | 2.55 | 2.25 | 1.94 |
| | 10 | 1.99 | 1.85 | 1.72 |
| | 20 | 1.61 | 1.45 | 1.38 |

FIG. 25

FLOW CONTROL IN MICROFLUIDIC DEVICES

CROSS-REFERENCE TO RELATED APPLICATIONS

This application is related to and claims priority under 35 U.S.C. § 119(e) from U.S. Patent Application No. 63/171,989, filed Apr. 7, 2021, titled "Flow Control in Microfluidic Devices". This application is also related to and claims priority under 35 U.S.C. § 119(e) from U.S. Patent Application No. 63/068,842, filed Aug. 21, 2020, titled "Burst Valves for Capillary Flow Diagnostic Devices". The entire contents of each of the foregoing filings are incorporated herein by reference for all purposes.

GOVERNMENT LICENSE RIGHTS

This invention was made with government support under R33 ES024719 awarded by the National Institutes of Health. The government has certain rights in the invention.

TECHNICAL FIELD

Aspects of the present disclosure generally relate to microfluidic devices, and more particularly, to microfluidic devices and associated methods for controlling flow in microfluidic devices.

BACKGROUND

Capillary-driven microfluidic devices have gained popularity in the last decade as alternatives to traditional microfluidics. Instead of using an external pump to induce flow, capillary-driven devices utilize the surface tension of a fluid acting on the channel wall (or fibers in the case of paper) to drive flow. Without the need for a pump, these devices can be operated outside of a centralized lab in resource limited settings without a power source, among other advantages. Pregnancy tests are just one example of capillary-driven analytical devices and their widespread utility as platforms for at-home diagnostics.

Despite their broad utility, conventional capillary-driven devices are limited by various aspects including their ability to control flow selectively and accurately through the device. It is with this in mind that aspects of the present disclosure were conceived and developed.

SUMMARY

In one aspect of the present disclosure, a microfluidic device is provided. The microfluidic device includes a device body defining a microfluidic pathway. The microfluidic pathway includes a first channel, a second channel downstream of the first channel, and a junction including a transition between the first channel and the second channel. The transition is configured to inhibit fluid entering the transition from the first channel from forming a meniscus across the second channel, thereby inhibiting capillary-driven flow into the second channel. The microfluidic device further includes a valve that, when activated while capillary-driven flow of the fluid is inhibited at the transition, induces capillary-driven flow through the second channel by facilitating formation of the meniscus.

In certain implementations, the fluid entering the transition from the first channel is a first fluid, the meniscus is a combined meniscus formed by contacting the first fluid with a second fluid at the junction, and the valve induces capillary-driven flow through the second channel by delivering the second fluid to the junction.

In other implementations, the fluid entering the transition from the first channel is a first fluid and the valve includes a valve channel defined by the device body and in communication with the junction. In such implementations, the valve is activated by providing a second fluid through the valve channel such that the second fluid reaches the junction and contacts the first fluid. As a result, the meniscus is a combined meniscus formed by combination of the first fluid and the second fluid at the junction and the valve facilitates formation of the combined meniscus by delivering the second fluid to the junction.

In still other implementations, the fluid entering the transition from the first channel is a first fluid and the valve includes a plurality of valve channels defined by the device body, each of the plurality of valve channels being in communication with the junction. In such implementations, the valve is activated by providing one or more second fluids through the plurality of valve channels such that each of the one or more second fluids reach the junction. The meniscus in such embodiments is a combined meniscus formed by combination of the first fluid and each of the one or more second fluids at the junction. As a result, the valve facilitates formation of the combined meniscus by delivering each of the one or more second fluids to the junction.

In other implementations, the valve includes an inwardly deformable portion downstream of the transition and the valve is activated by depressing and subsequently releasing the inwardly deformable portion. Releasing the inwardly deformable portion induces a pressure reduction downstream of the transition and the pressure reduction draws fluid from the first channel across the transition to form the meniscus.

In other implementations, the valve includes a valve portion upstream of the transition and the valve is activated by manipulating the valve portion. Manipulating the valve portion induces a pressure increase upstream of the junction and the pressure increase pushes the fluid from the first channel across the transition to form the meniscus.

In yet other implementations, the valve includes a valve portion having an inner surface, and the valve is activated by manipulating the valve portion while capillary-driven flow of the fluid is inhibited at the transition. Manipulation of the valve portions results in the inner surface contacting the fluid while the fluid is inhibited, thereby at least partially forming the meniscus.

In other implementations, the device body is formed from a plurality of laminated layers. The first channel is defined by a first set of layers of the plurality of laminated layers and the second channel is defined by a second set of layers of the plurality of laminated layers. In such implementations, the second set of layers has a greater cross-sectional area than the first set of layers.

In other implementations, the device body is formed from a plurality of laminated layers. The first channel is defined by a first set of layers of the plurality of laminated layers and the second channel is defined by a second set of layers of the plurality of laminated layers. In such implementations, the second set of layers may be a proper superset of the first set of layers.

In yet other implementations, the device body is formed from a plurality of laminated layers with the first channel is defined by a first set of layers of the plurality of laminated layers. In such implementations, the valve includes a valve channel in communication with the junction and defined by a second set of layers of the plurality of laminated layers and in communication with the junction. Further in such implementations, the fluid entering the transition from the first channel is a first fluid and the valve is activated by providing a second fluid through the valve channel such that the second fluid reaches the junction and contacts the first fluid. The resulting meniscus is a combined meniscus formed by combination of the first fluid and the second fluid at the junction. Accordingly, the valve facilitates formation of the combined meniscus by delivering the second fluid to the junction. In such implementations, a portion of the valve channel immediately upstream of the junction may extend parallel to a portion of the first channel immediately upstream of the junction.

In another aspect of the present disclosure, a method of controlling flow in a microfluidic device is provided. The method includes directing flow of a fluid along a microfluidic pathway defined within a body of a microfluidic device, the microfluidic pathway including a first channel, a second channel downstream of the first channel, and a junction including a transition between the first channel and the second channel. The method further includes inhibiting capillary-driven flow of fluid entering the transition from the first channel such that formation of a meniscus in the second channel is inhibited. The method also includes forming a meniscus in the second channel responsive to activation of a valve of the microfluidic device after inhibiting capillary-driven flow of the fluid across the transition.

In certain implementations, the fluid entering the transition from the first channel is a first fluid, the meniscus in the second channel is a combined meniscus formed by contacting the first fluid with a second fluid at the junction, and forming the combined meniscus includes delivering the second fluid to the junction responsive to activation of the valve.

In other implementations, the fluid entering the transition from the first channel is a first fluid, the valve includes a valve channel defined by the device body and in communication with the junction, and the valve is activated by providing a second fluid through the valve channel such that the second fluid reaches the junction and contacts the first fluid. In such implementations, the meniscus is a combined meniscus formed by combination of the first fluid and the second fluid at the junction and forming the combined meniscus includes delivering the second fluid to the junction responsive to activation of the valve.

In still other implementations, the fluid entering the transition from the first channel is a first fluid, the valve includes a plurality of valve channels defined by the device body, each of the plurality of valve channels in communication with the junction, and the valve is activated by providing one or more second fluids through the plurality of valve channels such that each of the one or more second fluids reach the junction. In such implementations, the meniscus is a combined meniscus formed by combination of the first fluid and each of the one or more second fluids at the junction and forming the combined meniscus includes delivering each of the one or more second fluids to the junction responsive to activation of the valve.

In another implementation, the valve includes a valve portion at the transition, the valve is activated by manipulating the valve portion, and manipulating the valve portion induces a pressure reduction downstream of the transition. In such implementations, forming the meniscus includes drawing fluid from the first channel across the transition using the pressure reduction.

In other implementations, the valve includes a valve portion upstream of the transition and the valve is activated by manipulating the valve portion, thereby generating a pressure increase upstream of the transition. In such implementations, forming the meniscus may include the pressure increase upstream of the transition pushing the fluid from the first channel across the transition.

In still other implementations, the valve includes an inwardly deformable portion of the junction having an inner surface and the valve is activated by depressing the inwardly deformable portion while capillary-driven flow of the fluid is inhibited at the transition. In such implementations, forming the meniscus includes the inner surface contacting the fluid in response to activation of the valve.

In yet another aspect of the present disclosure, a microfluidic device is provided. The microfluidic device includes a device body formed from a plurality of laminated layers. The plurality of laminated layers defines a microfluidic pathway including a first channel defined by a first set of layers of the plurality of layers, a second channel downstream of the first channel and defined by a second set of layers of the plurality of layers, and a junction including a transition between the first channel and the second channel. The transition inhibits fluid entering the transition from the first channel from forming a meniscus across the second channel, thereby inhibiting capillary-driven flow into the second channel. The microfluidic device further includes a valve that, when activated while capillary-driven flow of the fluid is inhibited at the transition, induces capillary-driven flow through the second channel by facilitating formation of the meniscus.

In certain implementations, the valve includes a valve channel in communication with the junction and defined by a third set of layers of the plurality of laminated layers and in communication with the junction. The fluid entering the transition from the first channel is a first fluid and the valve is activated by providing a second fluid through the valve channel such that the second fluid reaches the junction and contacts the first fluid. In such implementations, the meniscus is a combined meniscus formed by combination of the first fluid and the second fluid at the junction, the valve facilitating formation of the combined meniscus by delivering the second fluid to the junction.

In other implementations, the valve includes a deformable portion of the device body that, when at least one of depressed or released, induces a change in pressure along the microfluidic pathway such that the change in pressure results in the fluid being delivered into the second channel to form the meniscus when capillary-driven flow of the fluid is inhibited at the transition.

BRIEF DESCRIPTION OF THE DRAWINGS

The present disclosure is described in conjunction with the appended figures.

FIGS. 24 and 25 are tables including fluid details used in the surface tension testing summarized in FIGS. 22 and 23.

Figure 1A:
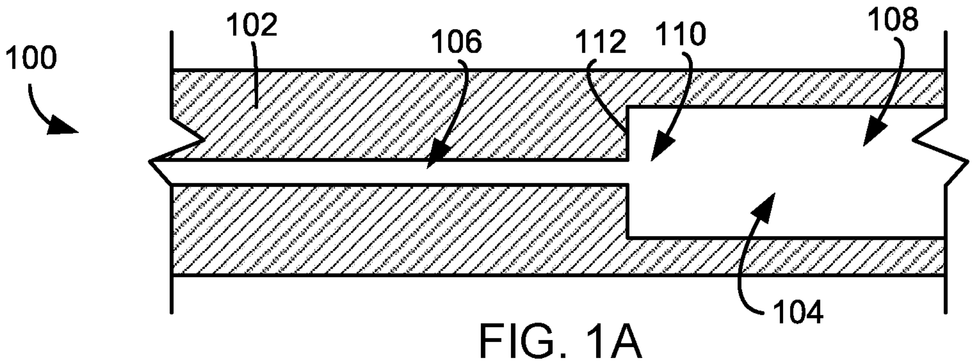
FIG. 1A-C are cross-sectional views of a microfluidic device in accordance with the present disclosure illustrating controlled flow of a fluid therein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Aspects of the present disclosure are directed to different flow control mechanisms for use in passive capillary-driven microfluidic devices. Among other things, the devices and methods disclosed herein permit flow control of fluids through microfluidic pathways by inhibiting capillary-driven flow within the device and selectively reinitiating flow by introducing additional fluids or inducing pressure changes along the microfluidic pathways. In certain implementations, the devices and methods disclosed herein further provide for controlled mixing of fluid components.

Capillary-driven microfluidics have been used in many applications, including the detection of bacteria, viruses, biomarkers, pesticides, and heavy metals. In each application, accurate and precise flow control is important to realize the specific analytical function. In analytical applications, flow is conventionally controlled by valving and/or controlling flow rate at a source. Conventional passive control methods, including adjusting the contact angle of surfaces of microfluidic channels and carefully designing channel geometry, are common ways to realize flow functions given that capillary force of fluid within the microfluidic channels is difficult to control once flow begins.

Capillary-driven microfluidics may be made from porous materials like cellulose. Although paper-based devices have shown promise as diagnostic tools, porous material may have limitations in particle and reagent transportation, may have low flow rate, and may exhibit non-uniform flow as compared to other suitable materials. Lamination-based methods that stack multiple layers of pre-cut papers or films to form microfluidic channels can overcome certain limitations of conventional porous-based devices. In lamination-based methods, the channel geometry is defined on each layer, then all layers are bonded, e.g., using an adhesive, plasma bonding, or toner. Double-sided adhesive (DSA) may be used for the fabrication of lamination-based microfluidic channels because the hollow channel can be generated directly on the DSA layer through a cutting process. Laminate capillary-driven microfluidic devices fabricated with porous material as one or more walls have shown a large increase in flow rate compared to single-layer alternatives. Lamination-based methods can also combine various substrate materials including paper, transparency film, glass, and acrylic. Laminate microfluidic devices composed of transparency films and DSA may also be used for rapid mixing without porous media. More specifically, non-uniform flow and flow resistance caused by cellulose fibers is reduced in laminate microfluidic devices and accurate and rapid flow functions can be realized. In general, laminate devices made of transparency film enable flow and analytical functions that are not achievable in conventional, porous-based capillary-driven channels.

The present disclosure is directed to flow control methods for laminate capillary-driven microfluidic devices. Among other things, this disclosure includes flow control methods that utilize geometry changes in microfluidic channels to control flow of fluids and facilitate mixing of fluids within the microfluidic devices. In at least certain implementations, the channels may be formed of the same material and flow control may be achieved without additional equipment, such as pumps or valves external the microfluidic devices.

With the foregoing in mind, FIG. 1A is a partial cross-sectional view of a microfluidic device 100 according to an implementation of the present disclosure and is intended to illustrate a technique for controlled inhibition of microfluidic flow through the microfluidic device 100. The microfluidic device 100 includes a device body 102 within which a microfluidic pathway 104 is formed. For purposes of the present disclosure, the term microfluidic pathway is generally used to refer to a geometrically constrained and smallscale pathway extending through at least a portion of the device body 102 and within which surface forces of a fluid disposed within the microfluidic pathway 104 dominate volumetric forces. Among other things, such domination of surface forces facilitates passive movement of fluid through the microfluidic pathway by way of capillary action and other similar phenomenon.

As illustrated in FIG. 1A, the microfluidic pathway 104 includes a first portion 106 and a second portion 108 connected at a junction 110 such that the second portion 108 is disposed downstream of the microfluidic pathway first portion 106. As shown in FIG. 1A, the second portion 108 has a substantially different cross-sectional geometry than the first portion 106 such that the junction 110 includes an abrupt transition 112 between the first portion 106 and the second portion 108.

Figure 1B:
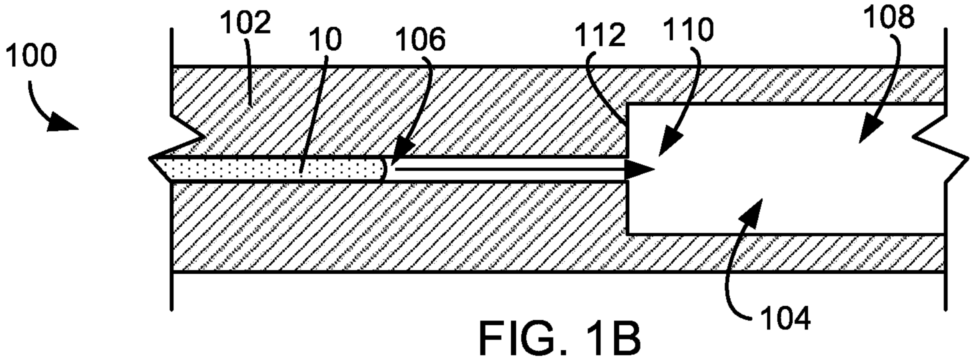

Referring next to FIG. 1B, which similarly illustrates the microfluidic device 100, a fluid 10 is illustrated as travelling through the first portion 106 of the microfluidic pathway 104. In general, such flow through the microfluidic pathway 104 is a result of capillary action, which occurs when adhesive forces of a fluid to a wall of a channel containing the fluid and other surface effects overcome cohesive forces between the liquid molecules. With reference to FIG. 1B, the adhesive forces of the fluid 10 to the surface of the first portion 106 of the microfluidic pathway 104 are illustrated as exceeding the cohesive forces of the surface of the fluid 10 such that the fluid 10 is driven through the first portion 106 toward the junction 110 by capillary action.

Figure 1C:
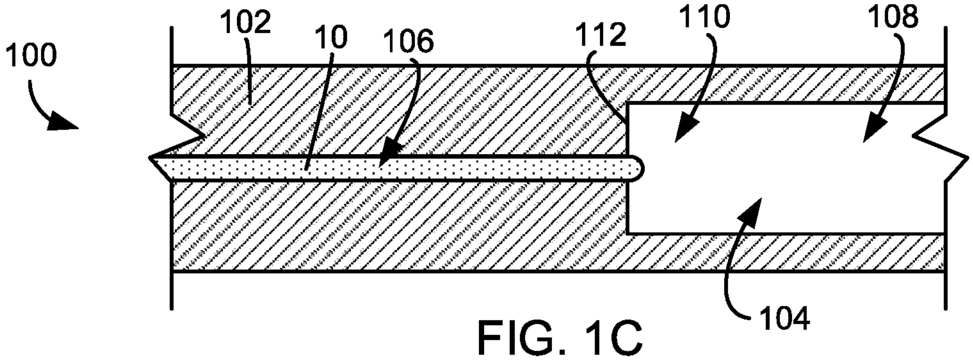

As illustrated in FIG. 1C, flow of the fluid 10 may be inhibited (up to and including being completely halted) at the transition 112 of the junction 110. In certain implementations, the transition 112 may correspond to an increase in cross-sectional area, change in cross-sectional shape, change in aspect ratio, or similar change between the cross-sectional geometry of the first portion 106 and the second portion 108 of the microfluidic pathway 104. In general, however, the transition 112 corresponds to a change between the first portion 106 and the second portion 108 that disrupts capillary-driven flow within the microfluidic pathway 104, e.g., by preventing sufficient contact between the fluid 10 and an interior surface of the second portion 108 of the microfluidic pathway 104. As a result, when the fluid 10 reaches the transition 112, adhesive forces between the fluid 10 and walls of the microfluidic pathway 104 are no longer able to overcome the surface forces of the fluid 10 and flow of the fluid 10 through the microfluidic pathway 104 is inhibited.

Once inhibited, flow through the microfluidic pathway may be reinitiated in various ways. For purposes of the present disclosure the terms "valve" and "valve mechanism" are used to generally refer to functionality of a microfluidic device that controls flow through a microfluidic pathway. Valves and valve mechanisms described herein may be selectively activated to reinitiate flow through the microfluidic pathway 104 following inhibition or cessation of flow, such as described above in the context of FIGS. 1A-C. Accordingly, a valve or valve mechanism in the context of the various implementations discussed herein may refer to one or more channels and corresponding layers of a microfluidic device that provide flow control functionality. In certain implementations, activation of valves or valve mechanisms described herein may include injecting or otherwise inducing flow of one or more control fluids. The control fluids may then interact with an inhibited fluid to reinitiate flow of the inhibited flow. As another example, flow control functionality may be based on inducing pressure changes within the microfluidic device. In such implementations, the valve or valve mechanism may generally include a deformable portion of the microfluidic device body that, when manipulated, induces the necessary pressure change to reinitiate flow of an inhibit fluid. Accordingly, activation of the valve in such cases generally includes performing the necessary manipulation of the deformable portion to induce the pressure change.

FIGS. 2A-D, for example, are cross-sectional views of a second implementation of a microfluidic device 200 according to the present disclosure in which flow is reinitiated by contacting a first and inhibited fluid with a second fluid (sometimes referred to herein as a "control fluid"). For the purposes of the present disclosure, such valves and valve mechanisms are generally referred to as fluidic valves in that they rely on interaction between fluids to control flow to selectively control flow. For example, and as described below in further detail, fluidic valves according to the present disclosure may be adapted to selectively reinitiate flow of the first fluid following inhibition by controlling contact of the first fluid with the second fluid.

Figure 2A:
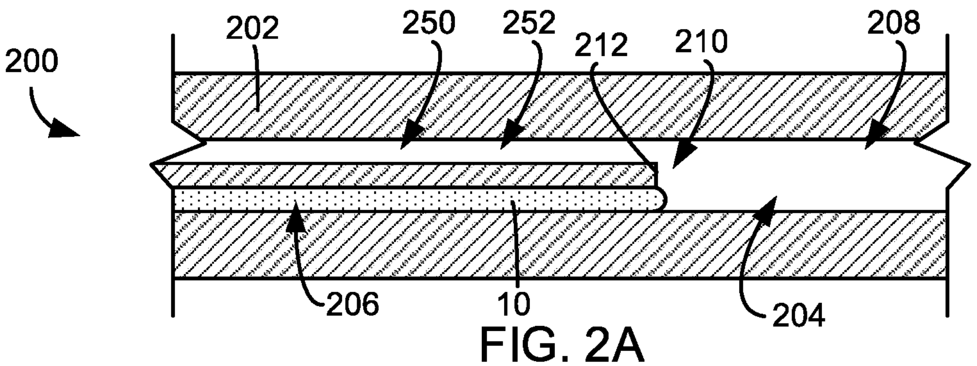
FIG. 2A-D are cross-sectional views of a microfluidic device in accordance with the present disclosure including a first fluidic valve mechanism.

As shown in FIGS. 2A-D, the microfluidic device 200 includes a device body 202 within which a microfluidic pathway 204 is formed. The microfluidic pathway 204 includes a first portion 206 and a second portion 208 disposed downstream of the first portion 206 such that the first portion 206 and the second portion 208 are connected at a junction 210. The junction 210 includes an abrupt transition 212 between the first portion 206 and the second portion 208, which, as illustrated in FIG. 2A may be used to inhibit flow of a first fluid 10 at the junction 210. Stated differently, the junction 210 inhibits flow of the first fluid 10 from the first portion 206 into the second portion 208.

Figure 2B:
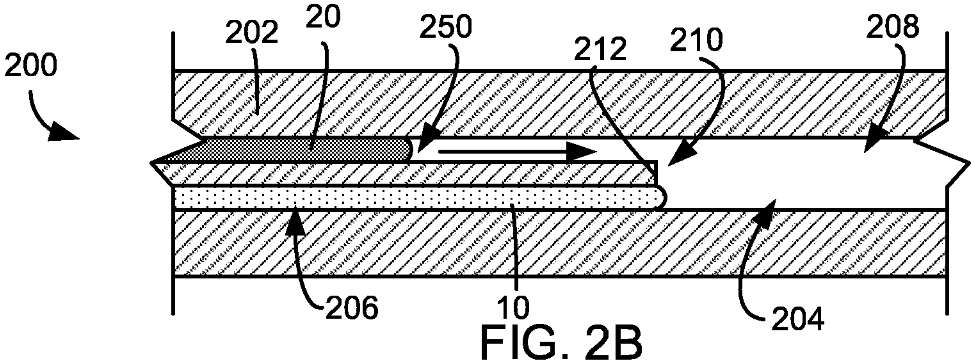

The microfluidic device 200 further includes a fluidic valve 250 including a microfluidic valve channel 252 defined by the device body 202 and extending to the junction 210. During operation, and as illustrated in FIG. 2B, a second fluid 20 is introduced into the valve channel 252 and subsequently flows to the junction 210, e.g., by capillary action.

Figure 2C:
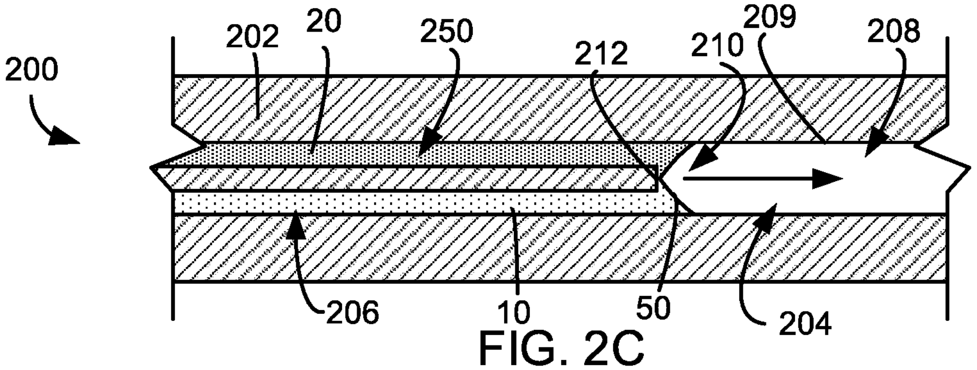
Figure 2D:
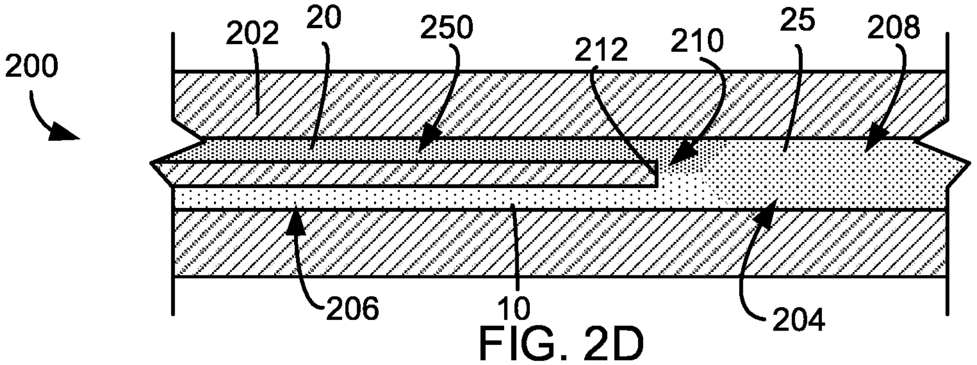

Referring next to FIG. 2C, when the second fluid 20 reaches the junction 210, the second fluid 20 interacts with the first fluid 10, flow of which is inhibited at the junction 210. More specifically, the first fluid 10 and the second fluid 20 contact each other to form a combined meniscus 50. As illustrated in FIG. 2C, the combined meniscus 50 may extend across the second portion 208 such that the combined meniscus 50 contacts an interior surface 209 of the second portion 208 and adhesive forces between the combination of the first fluid 10 and the second fluid 20 and the interior surface 209 is increased. The increase in adhesive force is such that flow within the microfluidic pathway 204 is reinitiated with the combined meniscus 50 forming a fluid front travelling through the second portion 208 of the microfluidic pathway 204. As illustrated in FIG. 2D, as the first fluid 10 and the second fluid 20 continue to flow, they may further combine downstream of the junction 210, thereby forming a combined fluid 25.

Figure 3A:
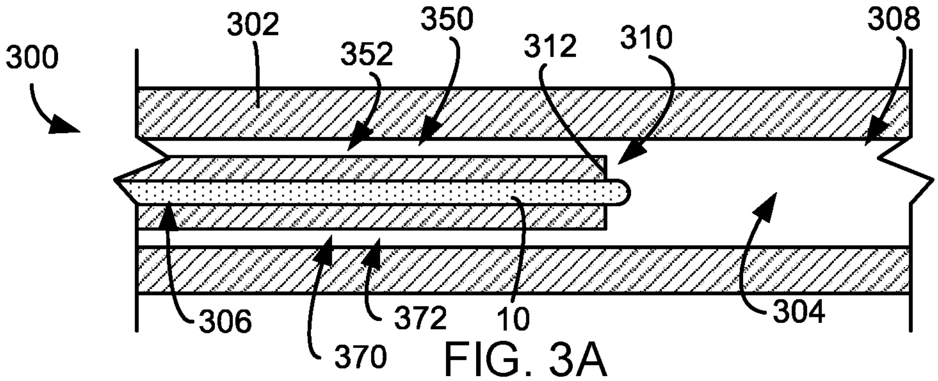
FIG. 3A-D are cross-sectional views of a microfluidic device in accordance with the present disclosure including a second fluidic valve mechanism.

FIGS. 3A-D illustrate an alternative implementation of a microfluidic device 300 in accordance with the present disclosure and in which flow through the microfluidic pathway is reinitiated using multiple fluidic valves. As shown, the microfluidic device 300 includes a device body 302 within which a microfluidic pathway 304 is formed. The microfluidic pathway 304 includes a first portion 306 and a second portion 308 disposed downstream of the first portion 306 with the first portion 306 and the second portion 308 connected at a junction 310. The junction 310 includes an abrupt transition 312 between the first portion 306 and the second portion 308, which, as illustrated in FIG. 3A may be used to inhibit flow of a first fluid 10 through the microfluidic pathway 304 at the junction 310.

Figure 3B:
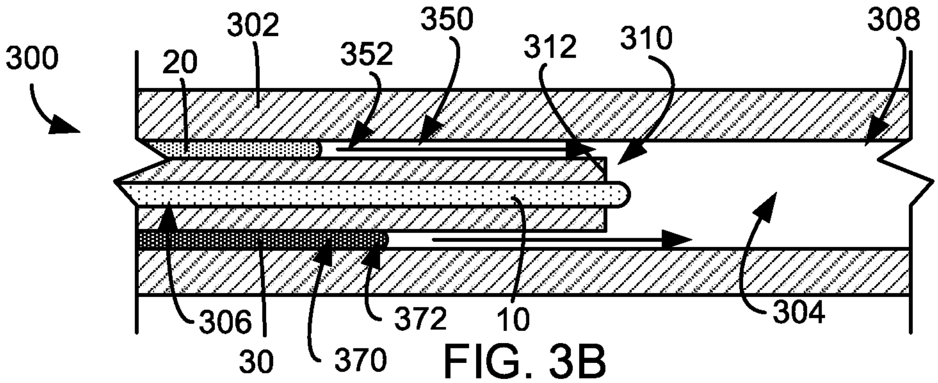

The microfluidic device 300 further includes each of a first fluidic valve 350 and a second fluidic valve 370. As illustrated, the first fluidic valve 350 includes a first microfluidic valve channel 352 defined by the device body 302 and extending to the junction 310 and the second fluidic valve 370 includes a second microfluidic valve channel 372 defined by the device body 302 and extending to the junction 310. During operation, and as illustrated in FIG. 3B, each of a second fluid 20 may be introduced into the first valve channel 352 and a third fluid 30 may be introduced into the second valve channel 372. Following their introduction, each of the second fluid 20 and the third fluid 30 reach the junction 310 by capillary action.

Figure 3C:
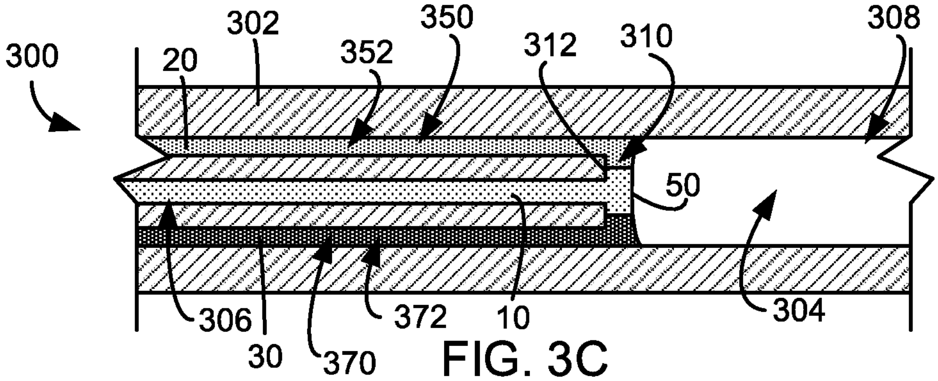
Figure 3D:
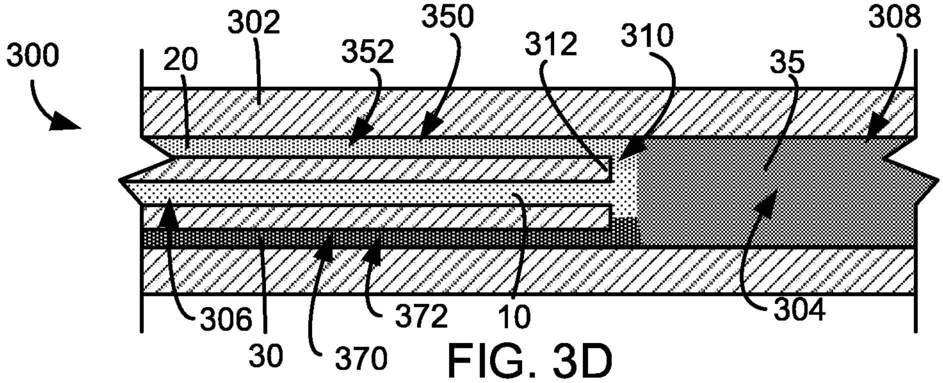

Referring next to FIG. 3C, each of the second fluid 20 and the third fluid 30 reach the junction 310 and interact with the first fluid 10, the flow of which is inhibited at the junction 310. The combination of the first fluid 10, the second fluid 20, and the third fluid 30 form a combined meniscus 50. As illustrated, the combined meniscus 50 extends across the second portion 308 and as a result, adhesive force on the combined fluids is increased. The increase in adhesive force is such that flow within the microfluidic pathway 304 is reinitiated with the combined meniscus 50 forming a fluid front travelling through the microfluidic pathway 304. As illustrated in FIG. 3D, as the fluids continue to flow, the first fluid 10, the second fluid 20, and the third fluid 30 may further combine downstream of the junction 310, thereby forming a combined fluid 35.

As illustrated in FIGS. 3A-D and discussed above, flow may be reinitiated through the microfluidic pathway 304 in response to the second fluid 20 and the third fluid 30 reaching the junction 310 and interacting with the first fluid 10 following inhibition of the first fluid 10 at the junction 310. In at least certain implementations, the second fluid 20 may arrive at the junction 310 before the third fluid 30. In such cases, the fluid arriving first may form a partial meniscus with the first fluid 10 that does not result in sufficient adhesive force to reinitiate flow through the microfluidic pathway 304. Stated differently, in at least certain implementations, fluid flow through the microfluidic pathway 304 may remain inhibited until both the second fluid 20 and the third fluid 30 arrive at the junction 310.

Although illustrated as including two fluidic valves, implementations of the present disclosure are not limited to any specific number of fluidic valves. Moreover, while the foregoing example required that both the second fluid 20 and the third fluid 30 reach the junction 310 to reinitiate flow through the microfluidic pathway 304, in other implementations of the present disclosure, flow may be reinitiated when either the second fluid 20 or the third fluid 30 reach the junction 310. More generally, implementations of the present disclosure including multiple valve channels may be configured to reinitiate flow in response to fluid reaching the junction 310 from any combination of fluidic valves and in any order.

Figure 4A:
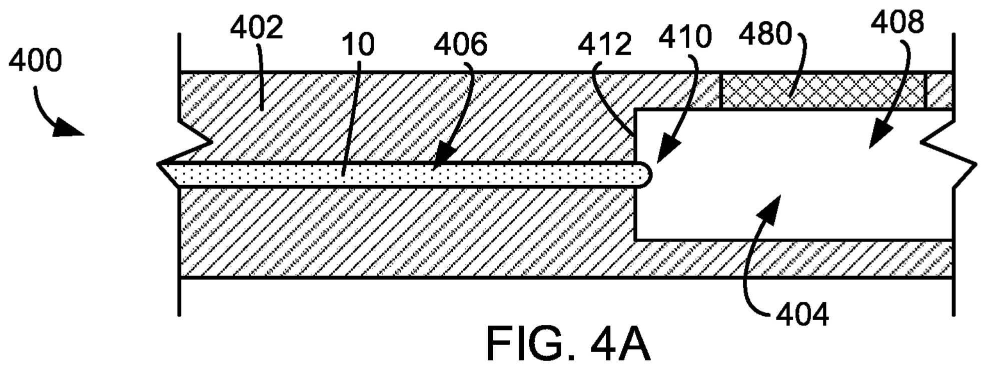
FIG. 4A-C are cross-sectional views of a microfluidic device in accordance with the present disclosure including a downstream pressure valve mechanism.
Figure 4B:
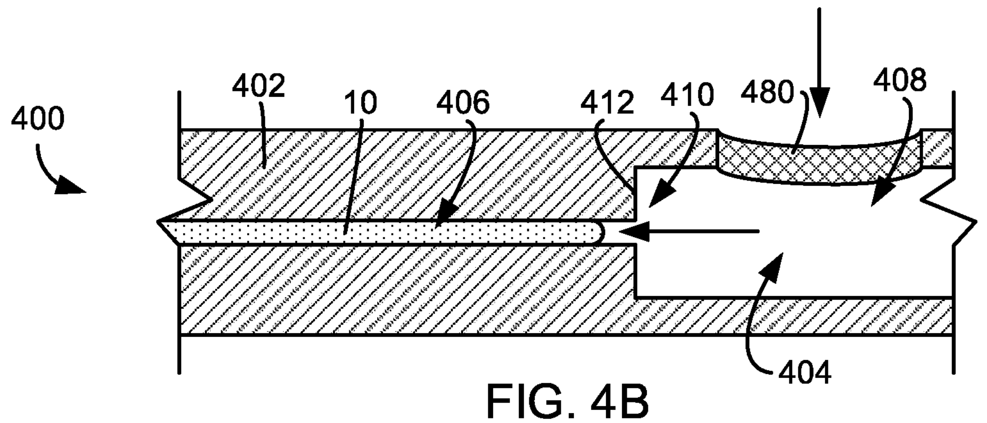
Figure 4C:
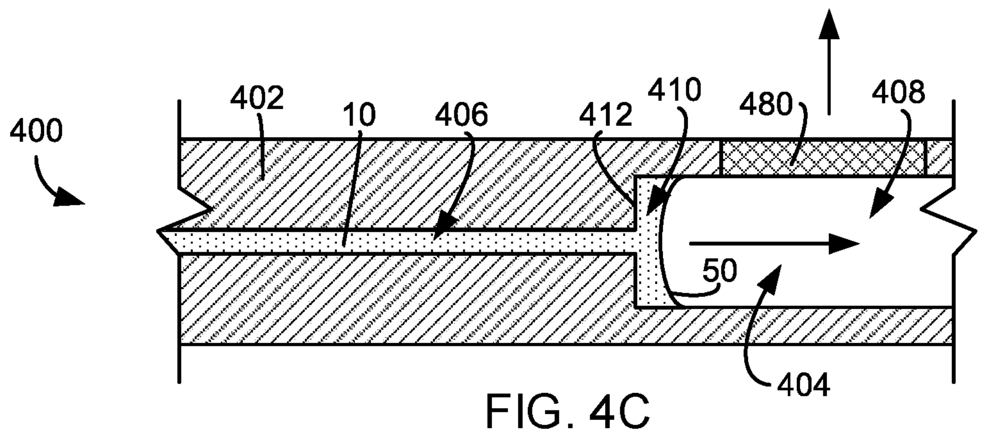

FIGS. 4A-C illustrate an alternative implementation of a microfluidic device 400 in accordance with the present disclosure and including a valve mechanism in the form of a deformable portion that, when manipulated, induces a pressure reduction downstream of an inhibited fluid to reinitiate flow of the inhibited fluid. For purposes of the present disclosure and for convenience only, such valve mechanisms may be referred to herein as pressure valves. As shown, the microfluidic device 400 includes a device body 402 within which a microfluidic pathway 404 is formed. The microfluidic pathway 404 includes a first portion 406 and a second portion 408 disposed downstream of the first portion 406, such that the first portion 406 and the second portion 408 are connected at a junction 410. The junction 410 includes an abrupt transition 412 between the first portion 406 and the second portion 408, which, as illustrated in FIG. 4A may be used to inhibit flow of a fluid 10 through the microfluidic pathway 404 at the junction 410.

The microfluidic device 400 further includes a deformable portion 480 disposed downstream of the junction 410. In certain implementations, the deformable portion 480 may be a thin portion of the device body 402, a deformable insert, or similar component coupled to or integrated with the device body 402. The deformable portion 480 is generally configured to induce a pressure reduction downstream of the junction 410. For example, as illustrated in FIG. 4B, the deformable portion 480 may be depressed such that it flexes inwardly, thereby modifying an internal volume of the microfluidic pathway 404. As further illustrated in FIG. 4C, force on the deformable portion 480 may be subsequently released such that the deformable portion 480 returns to its original configuration, thereby returning the microfluidic pathway 404 to its original volume.

Referring to FIG. 4B, in at least certain implementations, depressing the deformable portion 480 may induce an initial pressure increase within the second portion 408 that causes the fluid 10 to retract into the first portion 406. However, as shown in FIG. 4C, returning the microfluidic pathway 404 to its original configuration induces a rapid pressure drop in the second portion 408 such that a sufficient amount of the fluid 10 is drawn into the second portion 408 to form a meniscus 50 extending across the second portion 408. As a result, adhesive force on the fluid 10 may be increased to the point that capillary-driven flow of the fluid 10 is reinitiated.

The deformable portion 480 illustrated in FIGS. 4A-C is one example approach for inducing a pressure drop in the second portion 408 to draw the fluid 10 into the second portion 408, thereby reinitiating flow through the microfluidic pathway 404. In general, however, any suitable mechanism for inducing a pressure drop downstream of the junction 410 may be used to reinitiate flow after the fluid 10 has been inhibited at the junction 410.

Figure 5A:
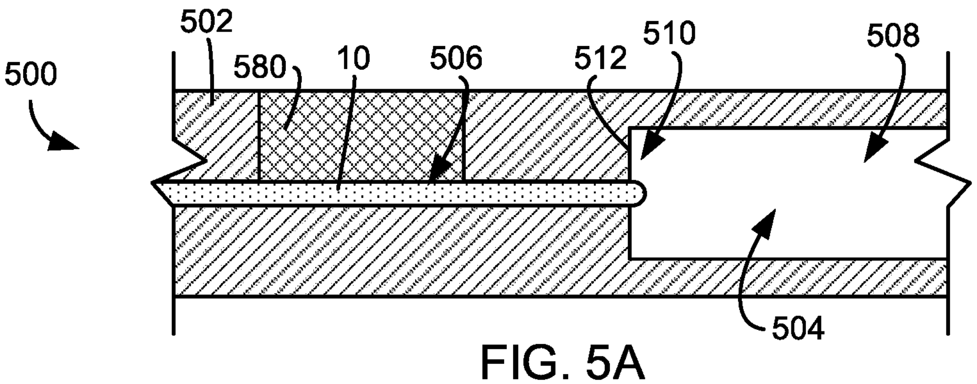
FIG. 5A-C are cross-sectional views of a microfluidic device in accordance with the present disclosure including an upstream pressure valve mechanism.
Figure 5B:
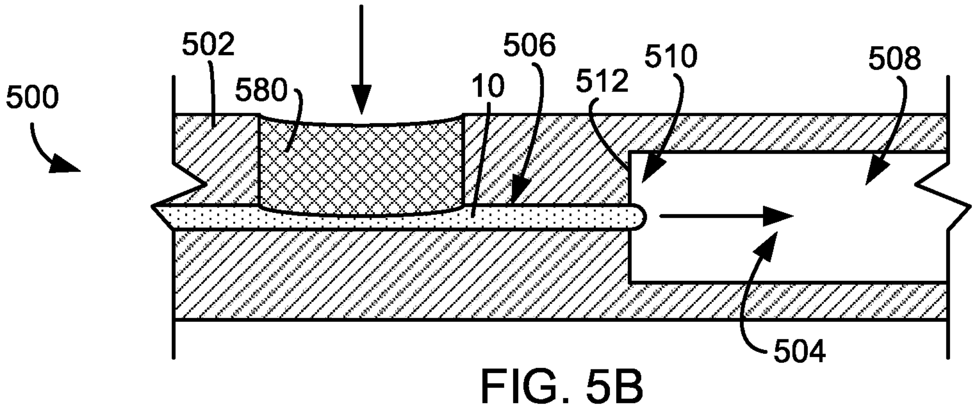
Figure 5C:
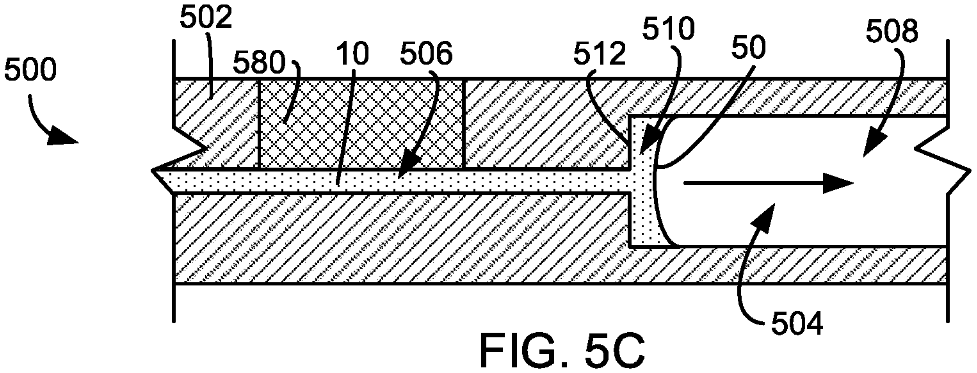

FIGS. 5A-C illustrate an alternative implementation of a microfluidic device 500 in accordance with the present disclosure and in which flow through the microfluidic pathway is reinitiated via an upstream pressure increase. Stated differently, the microfluidic device 500 illustrates another example of a pressure valve in accordance with the present disclosure. As shown, the microfluidic device 500 includes a device body 502 within which a microfluidic pathway 504 is formed. The microfluidic pathway 504 includes a first portion 506 and a second portion 508 downstream of the first portion 506 such that the microfluidic pathway 504 and the first portion 506 are connected at a junction 510. The junction 510 includes an abrupt transition 512 between the first portion 506 and the second portion 508, which, as illustrated in FIG. 5A may be used to inhibit flow of a fluid 10 through the microfluidic pathway 504 at the junction 510.

The microfluidic device 500 further includes a deformable portion 580 disposed upstream of the junction 510. In certain implementations, the deformable portion 580 may be a thin portion of the device body 502, a deformable insert, or similar component coupled to or integrated with the device body 502. The deformable portion 580 is generally configured to induce a pressure increase upstream of the junction 510. For example, as illustrated in FIG. 5B, the deformable portion 580 may be depressed such that it flexes inwardly, thereby modifying an internal volume of the microfluidic pathway 504 and increasing pressure therein. As shown in FIG. 5C, the pressure increase induced by activation of the deformable portion 580 introduces enough of the fluid 10 into the second portion 508 to form a meniscus 50 extending across the second portion 508. As a result, adhesive force on the fluid 10 may be increased to the point that capillary-driven flow of the fluid 10 is reinitiated.

The deformable portion 580 illustrated in FIGS. 5A-C is one example approach for inducing a pressure increase in the first portion 506 to introduce the fluid 10 into the second portion 508, thereby reinitiating flow through the microfluidic pathway 504. In general, however, any suitable mechanism for inducing a pressure increase downstream upstream of the junction 510 may be used to reinitiate flow after the fluid 10 has been inhibited at the junction 510.

The various flow control mechanisms discussed herein may be combined to provide a more complex flow control system. For example, FIGS. 6A-D are cross-sectional views of a microfluidic device 600 including a flow control system incorporating each of the fluidic valve concept discussed above in the context of FIGS. 2A-3D and the downstream pressure reduction concept discussed above in the context of FIGS. 4A-C. More generally, however, the present disclosure contemplates microfluidic devices that include any of the flow control concepts discussed herein in any suitable order and combination.

Figure 6A:
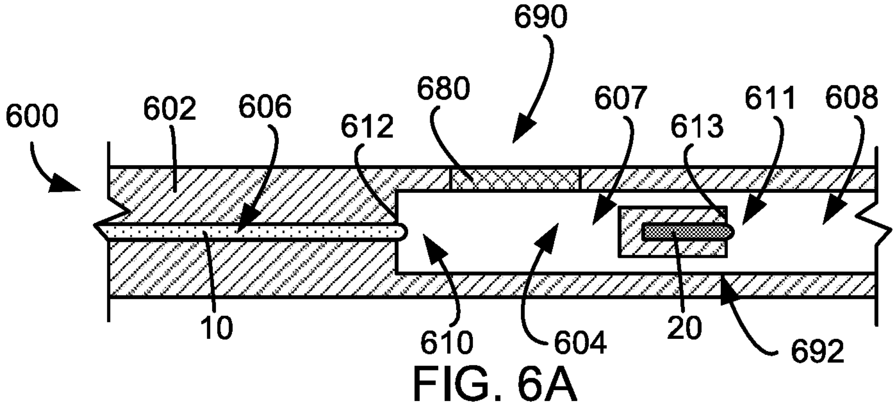
FIG. 6A-D are cross-sectional views of a microfluidic device in accordance with the present disclosure including each of a pressure valve mechanism and a fluidic valve mechanism.

FIGS. 6A-D illustrate an alternative implementation of a microfluidic device 600 in accordance with the present disclosure in which two-stage flow control is provided. As shown, the microfluidic device 600 includes a device body 602 within which a microfluidic pathway 604 is formed. The microfluidic pathway 604 includes an upstream portion 606 and an intermediate portion 607, and a downstream portion 608. The upstream portion 606 and the intermediate portion 607 meet at a first junction 610 and the intermediate portion 607 and the downstream portion 608 meet at a second junction 611. The first junction 610 and the second junction 611 include a first transition 612 and a second transition 613, respectively. As illustrated in FIG. 6A, flow of a first fluid 10 through the microfluidic pathway 604 is inhibited at the first junction 610 while flow of a second fluid 20 through the microfluidic pathway 604 is inhibited at the second junction 611.

Figure 6B:
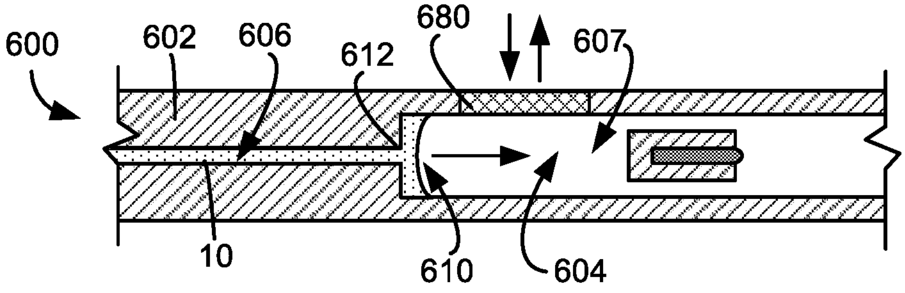
Figure 6C:
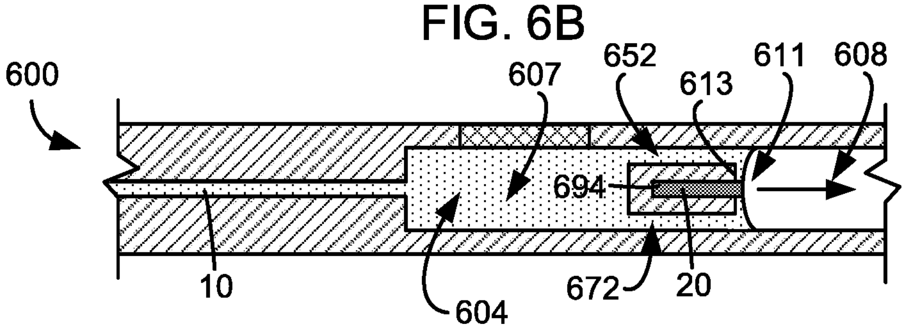

As previously noted, the microfluidic device 600 combines multiple flow control techniques discussed herein. In particular, the microfluidic device 600 includes a first device portion 690 in which flow control is achieved through a pressure reduction mechanism and a second device portion 692 in which flow control is achieved through a fluidic valve. Accordingly, and referring to FIG. 6B, reinitiation of flow of the first fluid 10 into the intermediate portion 607 from the upstream portion 606 is illustrated in response to depression and release of a deformable portion 680 disposed upstream of the first junction 610. As discussed in the context of FIG. 4A-C, such manipulation of the deformable portion 680 induces a pressure drop downstream of the first junction 610 such that the first fluid 10 is drawn into the intermediate portion 607 of the microfluidic pathway 604, As the first fluid 10 proceeds along the microfluidic pathway 604 and as illustrated in FIG. 6C, it is diverted into a pair of valve channels 652, 672 disposed on opposite sides of a port 694 through which the second fluid 20 is delivered into the microfluidic pathway 604. Notably, as illustrated in FIG. 6B, flow of the second fluid 20 into the microfluidic pathway 604 is inhibited because of the second transition 613.

Figure 6D:
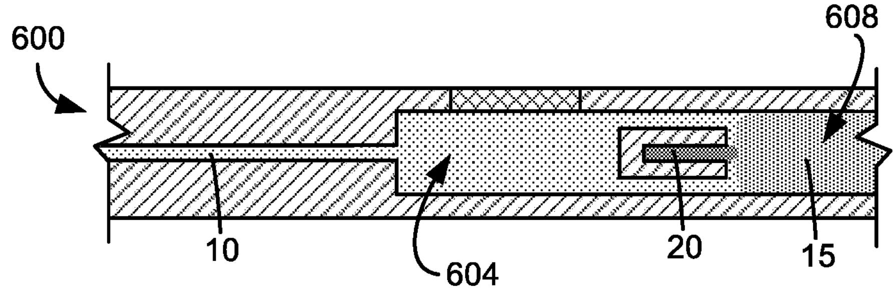

As shown in FIG. 6C, the first fluid 10 flows through the valve channels 652, 672 and interacts with the second fluid 20 (which is inhibited at the second transition 613) to form a combined meniscus 50 extending across the downstream portion 608 of the microfluidic pathway 604. As a result, flow into the downstream portion 608 of the microfluidic pathway 604 is reinitiated with the combined meniscus forming a fluid front. As illustrated in FIG. 6D, as flow continues, the first fluid 10 and second fluid 20 may generally combine to form a combined fluid 15.

Figure 7A:
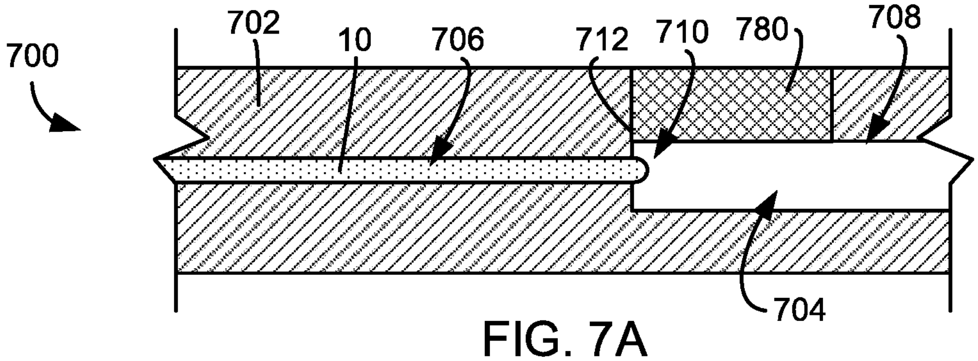
FIG. 7A-C are cross-sectional views of a microfluidic device in accordance with the present disclosure including a contact-based valve mechanism.
Figure 7B:
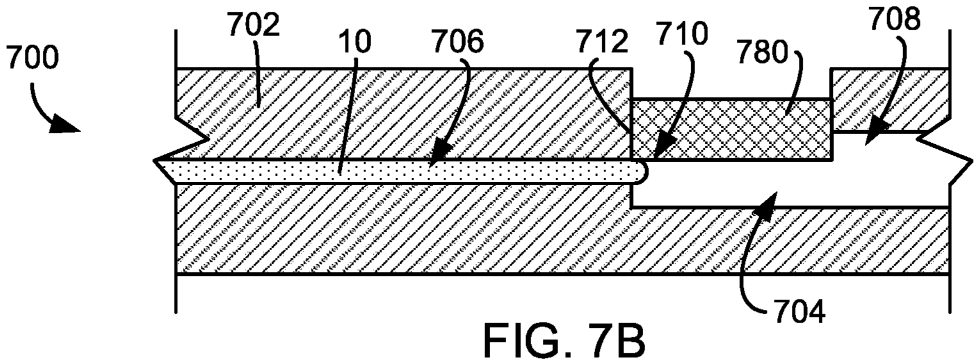
Figure 7C:
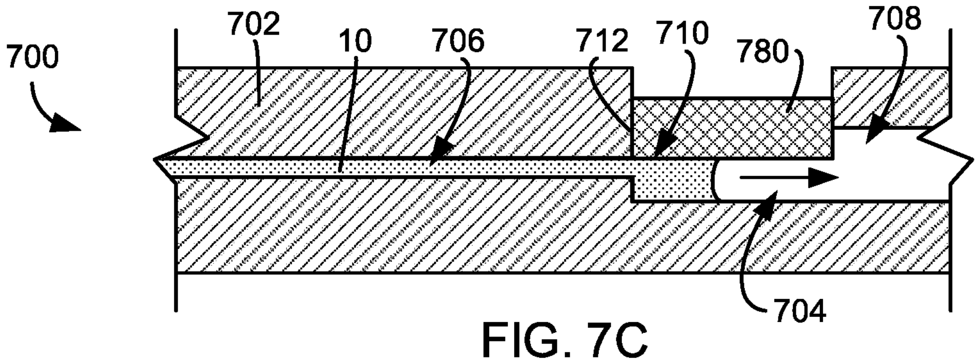

FIGS. 7A-C illustrate an alternative implementation of a microfluidic device 700 in accordance with the present disclosure and in which flow through the microfluidic pathway is reinitiated via locally reducing a portion of a junction between upstream and downstream channel portions. For purposes of the present disclosure, this type of valve mechanism is referred to herein as a contact-type valve. As shown, the microfluidic device 700 includes a device body 702 within which a microfluidic pathway 704 is formed. The microfluidic pathway 704 includes a first portion 706 and a second portion 708 disposed downstream of the portion 706 such that the portion 706 and the portion 708 are connected at a junction 710. The junction 710 includes an abrupt transition 712 between the first portion 706 and the second portion 708, which, as illustrated in FIG. 7A may be used to inhibit flow of a fluid 10 through the microfluidic pathway 704 at the junction 710.

The microfluidic device 700 further includes a movable portion 780 disposed upstream of the junction 710. In certain implementations, the movable portion 780 may be a sliding or deformable portion of the device body 702 or similar component coupled to or integrated with the device body 702. The movable portion 780 is generally configured to move inwardly to reduce the cross-sectional area of the microfluidic pathway 704 at the junction 710. More specifically, when activated, e.g., by pressing the movable portion 780 inward, an inner surface of the movable portion 780 contacts the fluid 10.

When the movable portion 780 contacts the fluid 10, adhesive force on the first fluid 10 increases. If such increase is sufficient, capillary-drive flow of the first fluid 10 may be resumed along the microfluidic pathway 704. For example, and with reference to FIG. 7C, adhesive forces on the fluid 10 resulting from contact with the movable portion 780 may be sufficient to draw the fluid 10 through the junction such that a meniscus 50 is formed across the microfluidic pathway 704, thereby further increasing adhesive forces on the fluid 10 and further driving capillary action.

Figure 8:
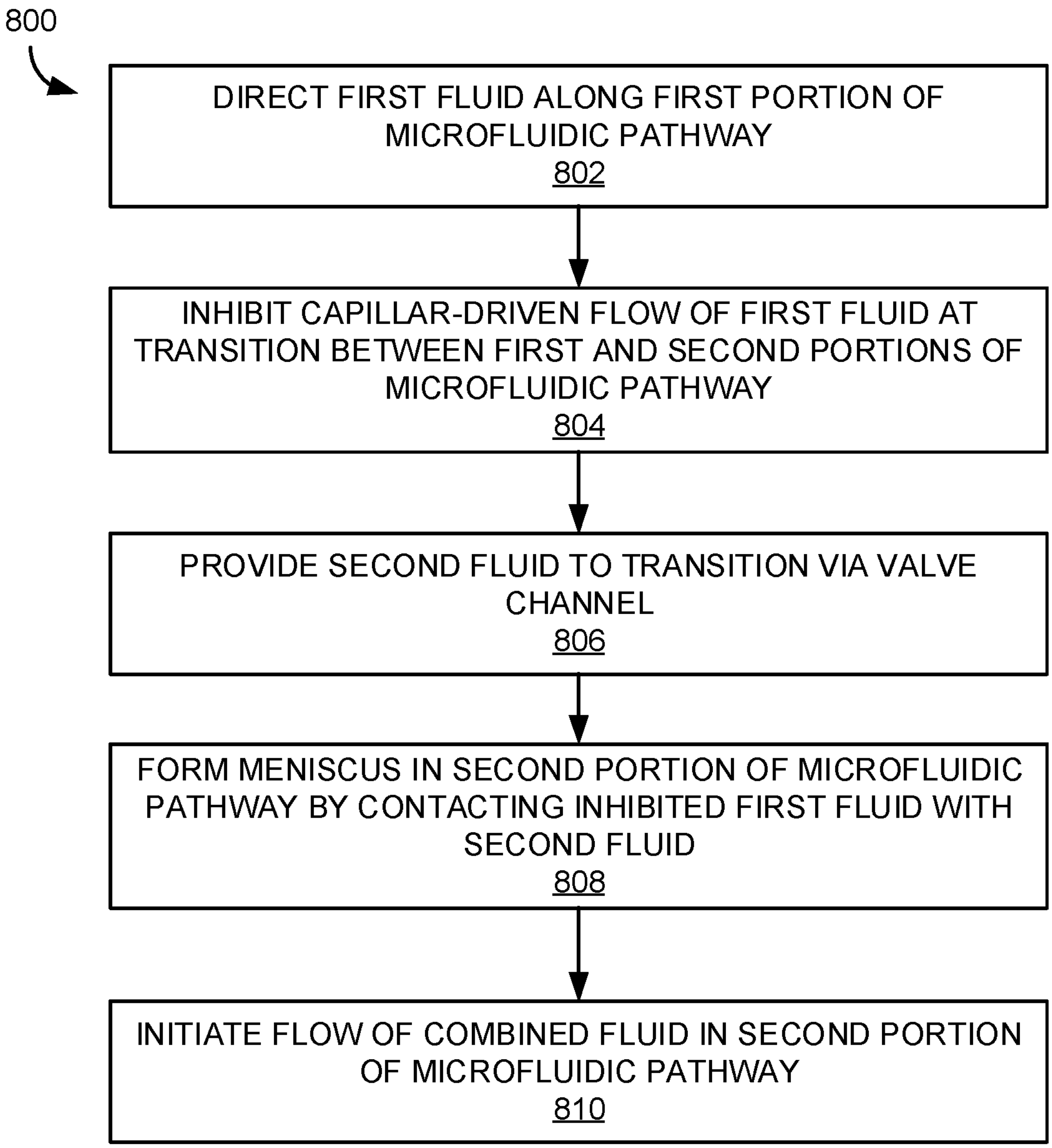
FIG. 8 is a flow chart illustrating a first method in accordance with the present disclosure, the method for controlling flow in microfluidic devices.

FIG. 8 is a flow chart illustrating a method 800 of flow control in microfluidic devices according to the present disclosure. In general, the method 800 is directed to flow control relying on fluidic valves and, in particular, flow control by inhibiting capillary-driven flow along a microfluidic pathway of a first fluid at a junction and subsequently delivering one or more additional fluids to the junction such that the first fluid and the one or more additional fluids combine to form a combined meniscus. The combined meniscus increases adhesive forces on the combined fluid, thereby reinitiating capillary-driven flow.

Referring to FIG. 8, the method 800 includes directing a first fluid along a first portion of a microfluidic pathway, e.g., by capillary-driven flow (operation 802). Next, the flow of the first fluid is inhibited at a transition between the first portion and a second channel downstream of the first portion (operation 804). As discussed herein, in at least certain implementations, such inhibition may be the result of the transition being sufficiently abrupt such that the first fluid is unable to contact a surface of the second channel, thereby reducing adhesive forces on the first fluid. After inhibiting flow of the first fluid, a second fluid is directed to the junction via a valve channel (operation 806). When the second fluid reaches the transition, the second fluid contacts and interacts with the inhibited first fluid, resulting in the formation of a meniscus across the second channel (operation 808). With the meniscus formed, capillary-driven flow of the combined fluid (e.g., the first fluid and the second fluid) initiates through the second channel (operation 810).

As previously discussed, in at least certain implementations, the second fluid may be one or more second fluids and initiation of flow through the second channel may result from the first fluid interacting with any combination of the one or more second fluids. Each second fluid of the one or more second fluids may be delivered to the transition by one or more channels. So, for example, one second fluid may be split between two different channels and provided to the transition via the two different channels. Similarly, the one or more second fluids may be the same fluid (including the same fluid provided from different sources) or may be different fluids.

Figure 9:
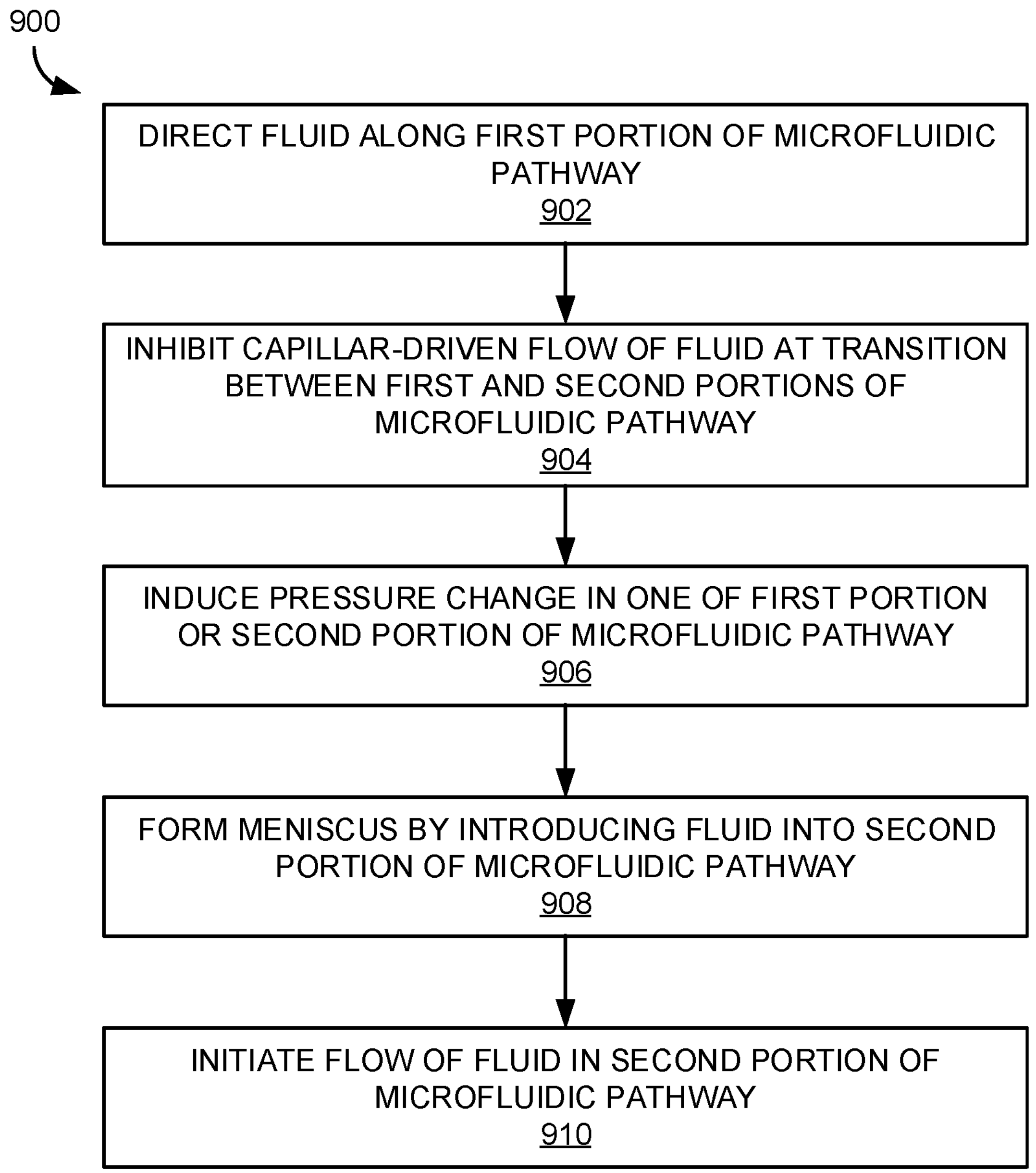
FIG. 9 is a flow chart illustrating a second method in accordance with the present disclosure, the method for controlling flow in microfluidic devices.

FIG. 9 is a flow chart illustrating another method 900 of flow control in microfluidic devices according to the present disclosure. In general, the method 900 is directed to flow control relying on induced pressure changes within a microfluidic pathway after inhibiting flow via a transition between a first and second microfluidic channel. The pressure change causes the inhibited flow to enter the second microfluidic channel and establish a meniscus that reinitiates capillary-driven flow of the fluid through the microfluidic channel.

Referring to FIG. 9, the method 900 includes directing a fluid along a first channel of a microfluidic pathway, e.g., by capillary-driven flow (operation 902). Next, the flow of the fluid is inhibited at a transition between the first channel and a second channel downstream of the first channel (operation 904). After inhibiting flow of the fluid, a pressure change is induced in one of the first channel and the second channel (operation 906). In implementations in which the pressure change is induced in the first channel, the pressure change may be a pressure increase that pushes fluid from the first channel into the second channel across the transition. In other implementations, the pressure change may be a pressure decrease in the second channel such that the fluid is drawn into the second channel. As discussed herein, in at least certain implementations, inducing the pressure change may include manipulating (e.g., depressing and/or releasing) a deformable portion of a body of the microfluidic device that modifies an internal volume of the microfluidic pathway. The fluid provided into the second channel by virtue of the pressure change forms a meniscus across the second channel (operation 908). With the meniscus formed, capillary-driven flow of the fluid resumes through the second channel (operation 910).

Implementations of the present disclosure may also be directed to mixing of fluids within microfluidic devices. More specifically, devices according to the present disclosure may include a common microfluidic channel that receive and combine fluids from multiple upstream channels. By varying how fluids from the upstream channels are combined, the degree and nature of mixing of the fluids may be controlled. For example, flows may be generated in which the combined fluid streams remain substantially separated in distinct layers, form a gradient with varying degrees of mixing across the width of the common channel, or may be substantially mixed within the common channel. In general, such variations in the flow through the common channel may be controlled based on where the constituent fluids are combined relative to the common channel and, in particular, the degree to which the constituent fluids are permitted to flow in parallel prior to combination.

Figure 10A:
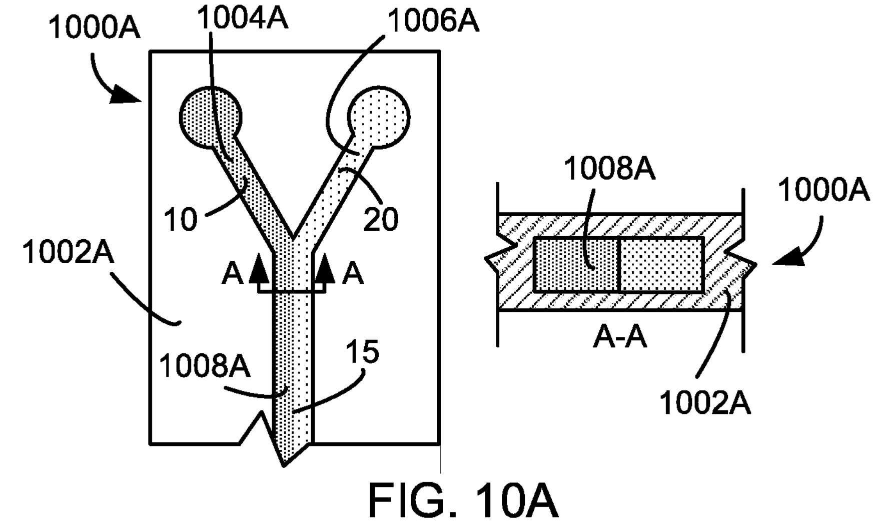
FIGS. 10A-C are schematic illustrations of microfluidic devices according to the present disclosure for providing different modes of fluid mixing.
Figure 10B:
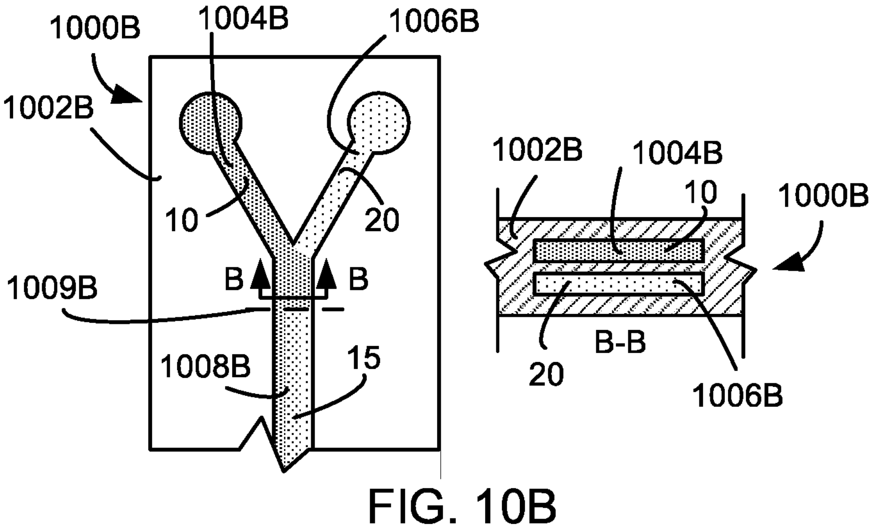
Figure 10C:
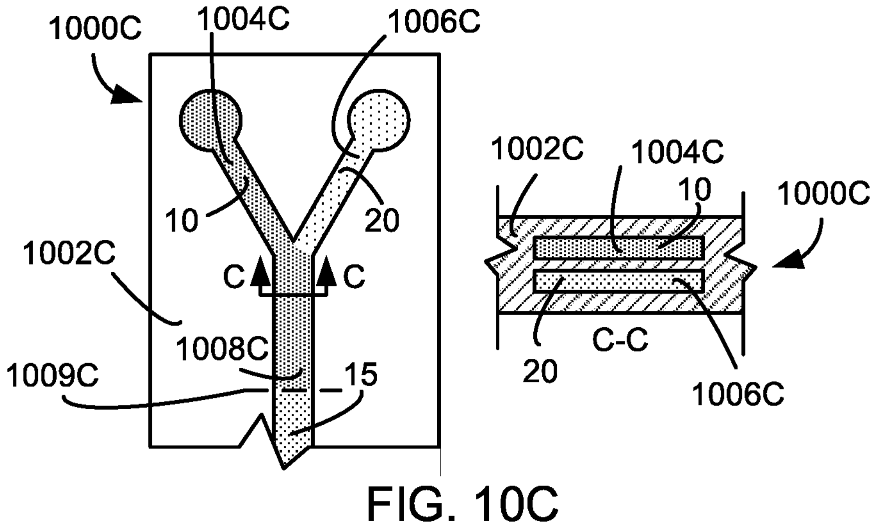

The foregoing concept is illustrated in FIGS. 10A-C. FIG. 10A illustrates an example microfluidic device 1000A having a device body 1002A. The device body 1002A defines a first channel 1004A, a second channel 1006A, and a common channel 1008A downstream of and in communication with each of the first channel 1004A and the second channel 1006A. A first fluid 10 is provided via the first channel 1004A and a second fluid 20 is provided via the second channel 1006B. FIG. 10B similarly illustrates a second microfluidic device 1000B having a device body 1002B. The device body 1002B defines a first channel 1004B, a second channel 1006B, and a common channel 1008B downstream of and in communication with each of the first channel 1004B and the second channel 1006B. A first fluid 10 is provided via the first channel 1004B and a second fluid 20 is provided via the second channel 1006B. Finally, FIG. 10C illustrates a third example microfluidic device 1000C having a device body 1002C. The device body 1002C defines a first channel 1004C, a second channel 1006C, and a common channel 1008C downstream of and in communication with each of the first channel 1004C and the second channel 1006C. A first fluid 10 is provided via the first channel 1004C and a second fluid 20 is provided via the second channel 1006C.

In general, the degree of mixing between the first fluid 10 and the second fluid 20 may be controlled by varying the degree to which fluid is permitted to flow in parallel before being combined in the common channel. For example, and referring first to FIG. 10A, the first channel 1004A and the second channel 1004A immediately intersect to form the common channel 1008A. Stated differently, flow of the first fluid 10 in the first channel 1004A and flow of the second fluid 20 in the second channel 1004A do not extend in parallel. As a result, the combined fluid 15 in the common channel 1008A may be substantially layered with little or no mixing between the first fluid 10 and the second fluid 20.

In contrast, the microfluidic device 1000B of FIG. 10B includes at least some overlap of the first channel 1004B and the second channel 1004B such that the first fluid 10 and the second fluid 20 are permitted to flow in parallel to each other within their respective channels. As shown in cross-section B-B, such flow may be achieved by layering a portion of the first channel 1004B and a portion of the second channel 1004B upstream of a start 1009B of the common channel 1008B. The microfluidic device 1000C of FIG. 10C similarly includes overlap of the first channel 1004C and the second channel 1004C such that the first fluid 10 and the second fluid 20 are permitted to flow in parallel to each other within their respective channels. Again, and as shown in cross-section C-C, such flow may be achieved by layering a portion of the first channel 1004C and a portion of the second channel 1004C upstream of a start 1009C of the common channel 1008C.

During experimentation, it was observed that, depending on the amount of overlap of the first channel and the second channel, the degree to which the first fluid and the second fluid mixed in the common channel could be varied by modifying the degree of overlap between the first channel and the second channel. For example, in implementations in which the degree of overlap of the first and second channel was relatively short, such as illustrated in FIG. 10B, a combined fluid 15 with an observable gradient could be produced. As the amount of overlap increased, the layering of the gradient became less prominent until, at a certain amount of overlap, such as illustrated in FIG. 10C, the combined fluid 15 was a relatively complete mixture of the first fluid 10 and the second fluid 20.

Considering the forgoing, implementations of the present disclosure include microfluidic devices in which multiple fluids are combined in a common channel with a controlled degree of mixing of the fluids. Among other things, the degree of mixing may be controlled by varying the degree of overlap (e.g., the distance over which the fluids are permitted to flow in parallel) prior to being combined within the common channel.

Experimental Testing—Overview

The various flow control techniques disclosed herein were experimentally tested and verified using laminate capillary-driven microfluidic devices. Emphasis during testing was placed on flow control methods that utilize changes in geometry of microfluidic channels of the same untreated material and without requiring additional equipment (e.g., external pumps, valves, etc.). The microfluidic channels used during testing were fabricated using double-sided adhesive (DSA) and transparency film layers and were composed of a multi-layered channel with a height change region at the junction.

First development efforts were directed to flow control techniques relying on valve mechanisms that could be implemented in multi-layered channel geometry. As previously disclosed herein, such mechanisms include valves that relying on changes in channel geometry to inhibit microfluidic flow. Once inhibited, microfluidic flow could be reinitiated by contacting the inhibited fluid with a second fluid or by inducing a pressure change within the microfluidic pathway.

Further testing was directed to a flow control method for controlling the flow rate and mixing/concentration distribution within a common channel fed by multiple upstream fluid channels. Finally, flow rate variation due to the channel height and fluid properties such as viscosity and surface tension were further confirmed.

During testing, deionized (DI) water, 10 wt % and 20 wt % of glycerin aqueous solutions, and 2.44 mM and 4.8 mM concentrations of sodium dodecyl sulfate (SDS) solutions were used. All solutions were dyed with tartrazine (yellow dye, 1870 μM) and erioglaucine (blue dye, 800 μM). Two types of capillary-driven microfluidic devices were fabricated by laminating double-sided adhesive and transparency film.

Figure 11A:
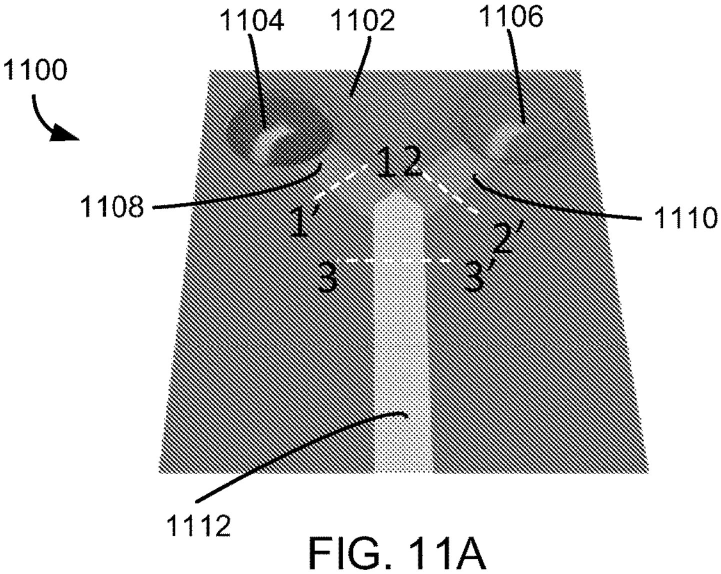
FIGS. 11A-C are schematic, cross-sectional, and exploded views of a first device used in experimental testing of microfluidic devices according to the present disclosure.
Figure 11B:
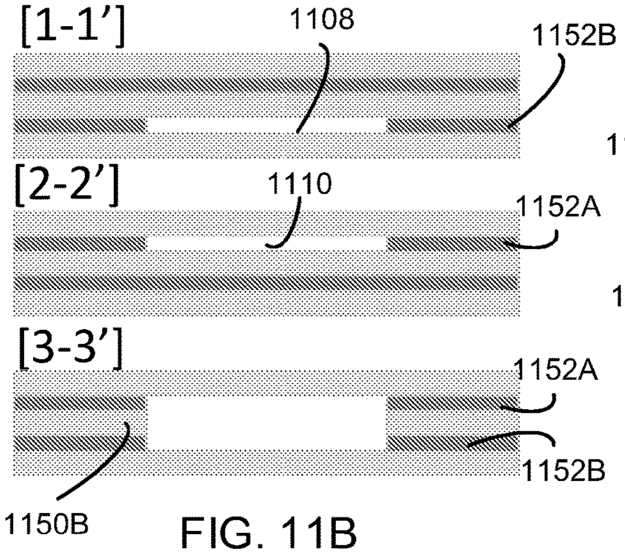
Figure 11C:
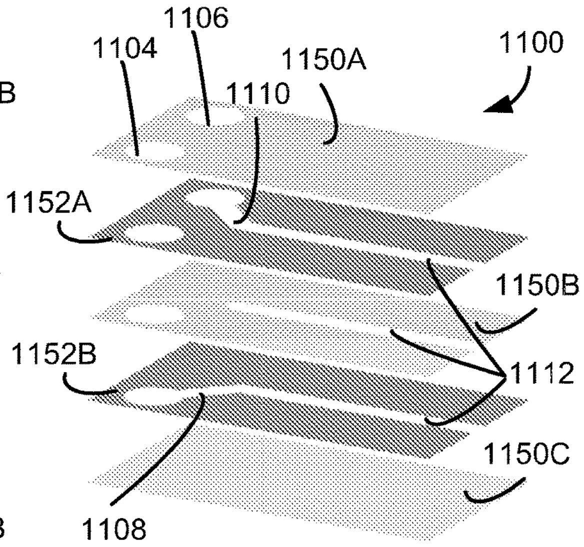

FIGS. 11A-C illustrate a first device 1100, including a perspective view (FIG. 11A), corresponding cross-sectional views (FIG. 11B), and an exploded view (FIG. 11C). As shown in FIGS. 11A-11C, the first device 1100 includes a device body 1102 including a first inlet 1104 and a second inlet 1106 in communication with a first inlet channel 1108 and a second inlet channel 1110, respectively. The first inlet channel 1108 and the second inlet channel 1110 meet to form a main channel 1112.

As illustrated in the exploded view of FIG. 11C, the first device 1100 is formed from five layers: three layers of transparency film 1150A-C between which are disposed two DSA layers 1152A, 1152B. As shown in the cross-sectional views of FIG. 11, the first inlet channel 1108 extends through DSA layer 1152B while the second inlet channel 1110 extends through DSA layer 1152A (see cross-sectional views [1-1'] and [2-2'], respectively) and the main channel 1112 extends through transparency film layer 1150B and DSA layers 1152A, 1152B. Accordingly, the main channel 1112 has a height greater than the combined height of the inlet channels 1108, 1110. State differently, the layers of the first device 1100 forming the main channel 1112 is a proper superset of the layers forming the inlet channels 1108, 1110.

Figure 12A:
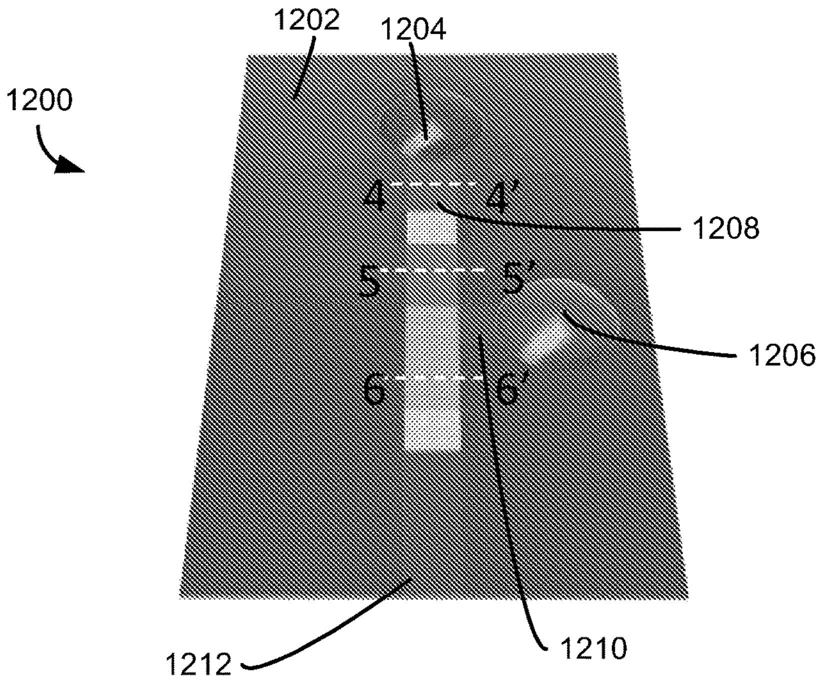
FIGS. 12A-C are schematic, cross-sectional, and exploded views of a second device used in experimental testing of microfluidic devices according to the present disclosure.
Figure 12B:
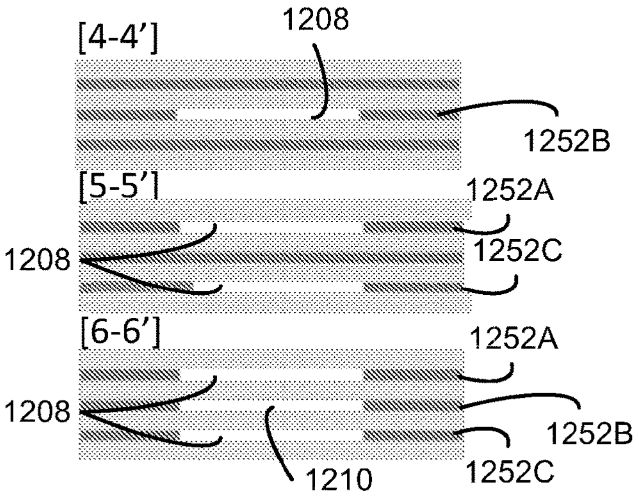
Figure 12C:
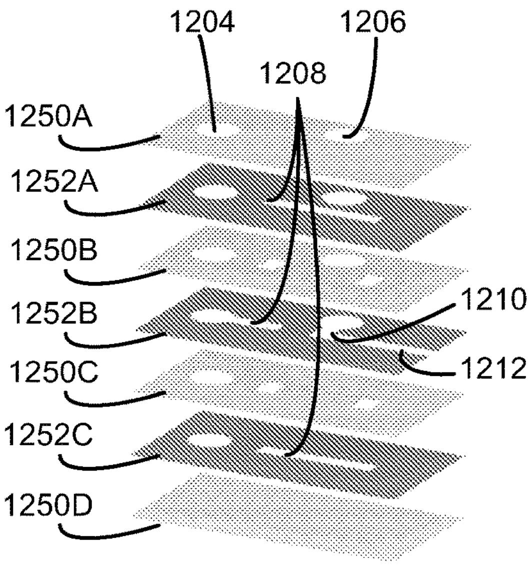

FIGS. 12A-12C illustrate a second device 1200, including corresponding cross-sectional and exploded views. As shown in FIGS. 12A-12C, the second device 1200 includes a device body 1202 including a first inlet 1204 and a second inlet 1206 in communication with a first inlet channel 1208 and a second inlet channel 1210, respectively. The first inlet channel 1208 and the second inlet channel 1210 meet to form a main channel 1212.

As illustrated in the exploded view of FIG. 12C, the second device 1200 is formed from seven layers: four layers of transparency film 1250A-D between which are disposed three DSA layers 1152A-C. As shown in the cross-sectional views of FIG. 12B, the first inlet channel 1208 initially extends through DSA layer 1152B (see cross-sectional view [4-4']) but splits along two paths (see cross-sectional views [5-5'] and [6-6']) through DSA layer 1252A and DSA layer 1252C. The second inlet channel 1210 extends through DSA layer 1252B (see cross-sectional view [6-6']). The main channel 1212 extends through DSA layers 1252B.

During testing, the thickness of DSA and transparency film layers for each device was 50 μm and 100 μm, respectively. The channel geometry was designed using design software and defined on each layer by laser cutting before assembling all layers. A multi-layered inlet geometry was implemented in all devices design.

The first device 1100 was generally designed and tested to evaluate fluidic valve designs, such as those described above in the context of FIGS. 2A-3D. For testing, the two inlet channels 1108, 1110 and the main channel 1112 were designed with 45 mm length and 3 mm widths, respectively. The width of the inlet channels 1108, 1110 was 3 mm and they were fabricated in three lengths from 2.5 mm to 10 mm. As noted above, each inlet channel 1108, 1110 was directed along a different vertical position, and the main channel 1112 was generally formed between the top and bottom transparency film layers, as shown in the cross-sectional views of FIG. 11B. Designs having three different heights of main channel 1112 were fabricated with the main channel heights ranging from 200 μm to 400 μm. Differences in main channel height were achieved by increasing the number of double-sided adhesive (DSA) layers sandwiched between the transparency film. Accordingly, the height of the inlet channels 1108, 1110 varied from 50 μm to 150 μm, respectively, depending on the height of the main channel 1112. The exploded view included in FIG. 11C generally reflects all geometries of the transparency film and DSA layers for the first device design 1100 as used during testing albeit with the thickness of the DSA layers varying as noted above.

The second device 1200 was generally designed and tested to evaluate devices including each of a contact-type valve and a fluidic valve, similar to the multi-valve design described above in the context of FIGS. 6A-D albeit with the contact-type valve substituted for the pressure-type valve of FIGS. 6A-D. As illustrated in the cross-sectional and exploded views of FIGS. 12B and C, the second device 1200 was fabricated using three layers of DSA and four layers of transparency film. The length and width of each of the main channel 1212 and the inlet channels 1208, 1210 were 45 mm and 3 mm, respectively. The inlet channels 1208, 1210 were formed in the DSA layers. For the experiments, 30 μL of blue and yellow solutions were pipetted at each inlet 1204,

1206 of the second device 1200 while the second device 1200 was placed horizontally.

All experiments were performed at about 25° C. and 30% humidity and recorded via a portable camera under the lab light environment. The distance variation of the flow front over time and the concentration field of the main channel area were analyzed using MATLAB. The concentration field was calculated based on the hue variations between blue and yellow color.

Experimental Testing—Selective Flow

Systems where two flows come together at the same point in a channel, called simultaneous inflow systems, are essential in capillary-driven devices composed of multiple inlets because different timing of fluid injection causes air to be trapped within the channel and may result in inconsistent flows. As disclosed herein, an abrupt change in channel geometry (e.g., channel height) enables a simultaneous inflow system in capillary-driven microfluidic devices which has a high aspect ratio (channel width over channel height).

FIGS. 13A-D are sequential images and corresponding side-sectional schematics for a simultaneous inflow system implemented in the first device 1100 illustrated in FIGS. 11A-C, accordingly, to the extent reference numerals in the following discussion are not included in FIGS. 13A-D, such numerals may be found in FIGS. 11A-C.

Figure 13A:
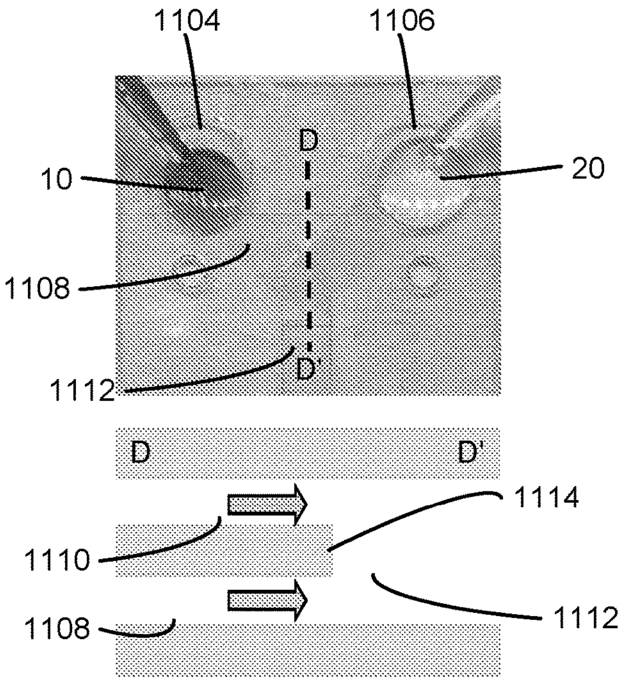
FIGS. 13A-D are images and cross-sectional views of the device of FIGS. 11A-C during testing.
Figure 13B:
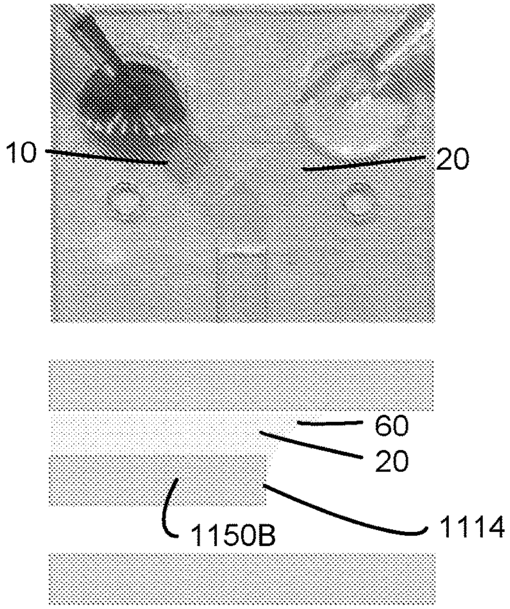
Figure 13C:
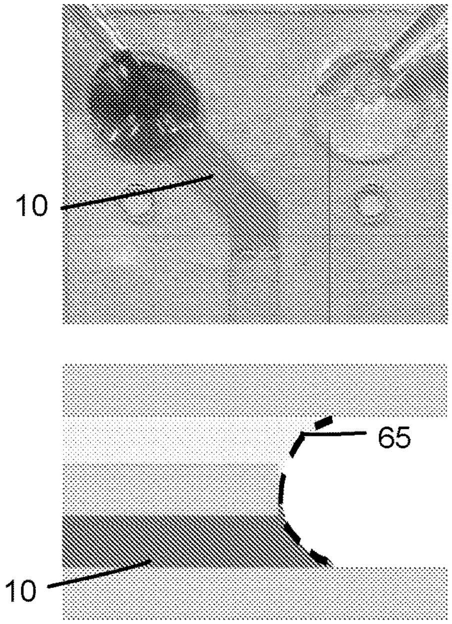
Figure 13D:
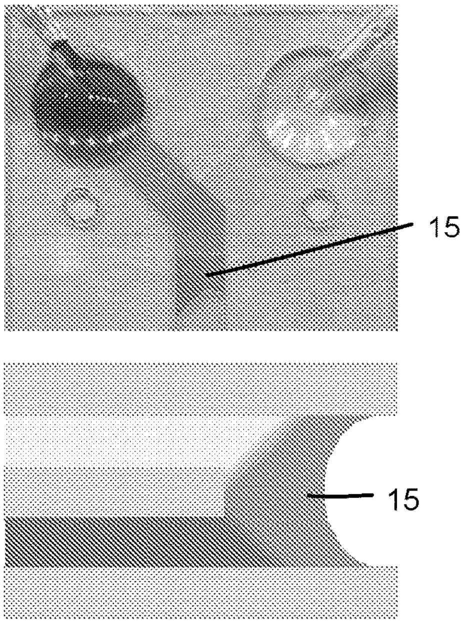

During testing, dyed DI water was injected at each inlet 1104, 1106. The inlet channels 1108, 1110 had a 50 μm height and were connected to the main channel 1112 at a junction 1114 (all identified in FIG. 13A). Although two fluids were pipetted at the same time, a second fluid 20 arrived at the junction first (as shown in FIG. 13B) because flow through the inlet channel 1110 was particularly fast (<1 second) and it was not possible to consistently synchronize fluid delivery to the inlets 1104, 1106. However, as illustrated in FIG. 13B, the second fluid 20 was inhibited from flowing into the main channel 1112 due to the change in channel geometry at the junction 1114. More specifically, a meniscus 60 of the second fluid 20 lost contact with middle transparency layer 1150B. When the first fluid 10 reached the junction 1114, a combined meniscus 65 resulted in the main channel 1112 (as shown in FIG. 13C), and both fluids 10, 20 began flowing through the main channel 1112 (as shown in FIG. 13D), forming a combined fluid 15. As a result, the geometry of the stacked inlet channels 1108, 1110, the main channel 1112, and the junction 1114 enabled simultaneous flow from two different inlets using the fluidic valve mechanism discussed herein.

FIGS. 14A-G illustrate sequential operation of the second device 1200 as captured during testing. More specifically, FIGS. 14A-E are photographs of the second device 1200 during various stages of operation while FIGS. 14F and G are sectional views of the second device 1200 that generally correspond to the states pictured in FIGS. 14B and 14F, respectively. As previously discussed, the second device 1200 incorporated two different valve mechanisms, namely a first contact-type valve mechanism and a second fluidic valve mechanism.

As previously discussed in the context of FIGS. 12A-C, each of the inlet channels 1208, 1210 was connected to a middle layer including a central channel 1212. The inlets 1204, 1206 were filled with a first fluid 10 and a second fluid 20 (e.g., blue and yellow DI water) and after initial injection, each of the first fluid 10 and the second fluid 20 were inhibited at respective junctions 1214A, 1214B due to corresponding changes in channel geometry at the junctions 1214A, 1214B (generally illustrated in FIGS. 14A and 14F).

During testing, it was observed that inhibition of the first fluid 10 in the second device 1200 at the junction 1214A was stronger and lasted longer than the inhibition of the second fluid 20 observed during testing of the first device 1100, likely due to the first fluid 10 losing contact with both top and bottom contact surfaces (e.g., transparency layers 1250B and 1250C) as compared to the first device 1100 in which the second fluid 20 only lost contact with a bottom contact surface (e.g., transparency layer 1150B). During testing, it was also observed that the time of fluid stop/inhibition could be affected by various factors including, but not limited to, fluid properties such as surface tension, contact angle, injected volume, and channel height. However, during testing, it was confirmed that the second device 1200 was able to inhibit flow of the first fluid 10 for >5 min in the configuration depicted in FIG. 14A-G.

Figure 14A:
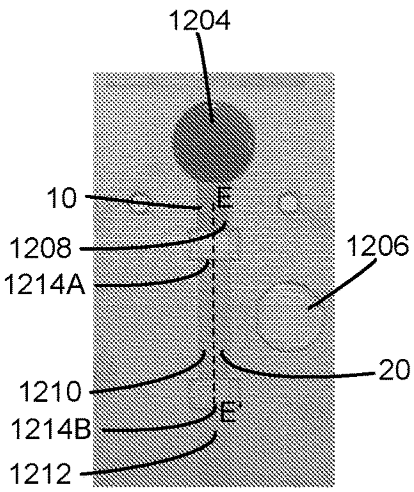
FIGS. 14A-G are images and cross-sectional views of the device of FIGS. 12A-C during testing.
Figure 14B:
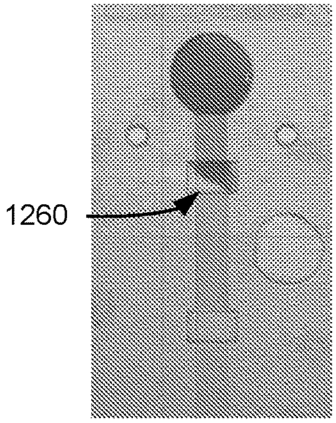
Figure 14C:
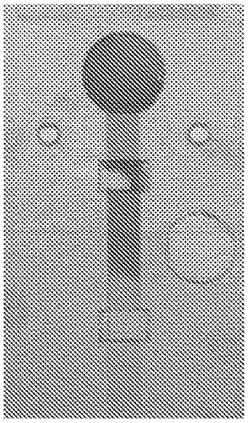
Figure 14D:
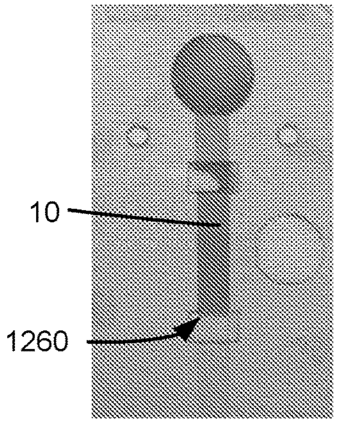
Figure 14E:
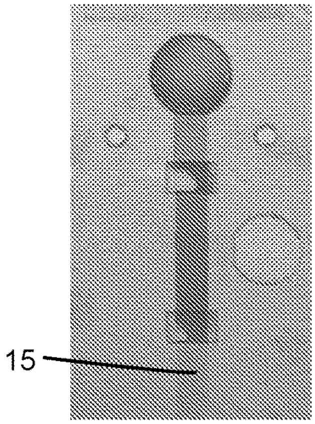
Figure 14F:
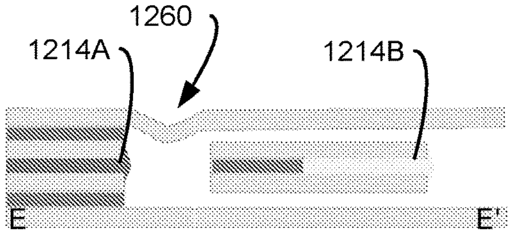
Figure 14G:
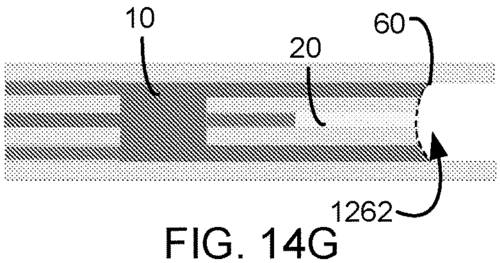

Referring to FIGS. 14B and F, the contact-type valve mechanism 1260 was activated by depressing the device body downstream of the junction 1214. Since transparency layer 1250A was flexible, it could be bent to contact the inhibited first fluid 10 to initiate flow as described herein generally in the context of FIGS. 7A-C. Following activation of the contact-type valve mechanism 1260, the first fluid 10 began to fill the area downstream of the junction 1214A, which, in the test, had a height of 350 μm. As shown in FIGS. 14E and D, the reinitiated flow of the first fluid 10 reaches the junction 1214B and activates the fluidic valve mechanism 1262 where the second fluid 20 is inhibited. As shown in FIGS. 14D and G, the first fluid 10 combined with the second fluid 20 in the middle channel 1210, forming a meniscus 60 downstream of the second valve mechanism and initiating constant downstream flow of the resulting combined fluid 15.

Experimental Testing—Flow Control by Changing Inlet Geometry

In the foregoing tests, the main channels of the tested devices consisted of untreated surfaces with straight geometry and in general, precluded substantial manipulation of flow in the main channels. Accordingly, further testing was conducted directed to changing concentration fields and flow rates in microfluidic devices having multiple fluid flows, such as the y-shaped device 1100 illustrated in FIGS. 11A-C. The general concept of controlled mixing was also discussed above in the context of FIGS. 10A-C. For clarity, the following discussion refers to the device 1100 of FIGS. 11A-C and its various features, however, the concepts discussed are not limited to devices having the specific configuration of the device 1100.

During testing, the geometry of the middle transparency layer 1150B, which defined the main channel 1112, was modified to control the concentration distribution in the main channel 1112. In general, the middle transparency layer 1150B enables simultaneous inflow of the first fluid 10 and the second fluid 20 into the main channel 1112 as well as controls the way the two fluids enter the main channel 1112.

Figure 15A:
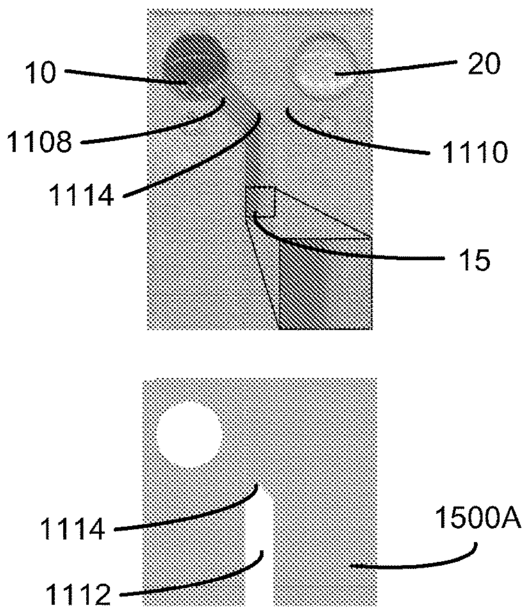
FIGS. 15A-C are images and schematic views of device configurations used during testing of fluid mixing functionality.
Figure 15B:
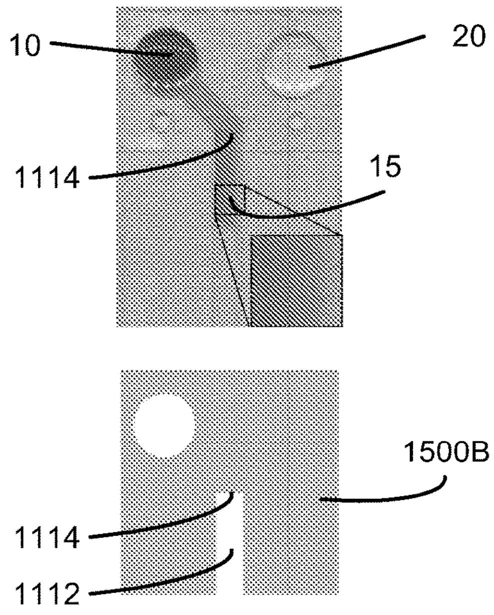
Figure 15C:
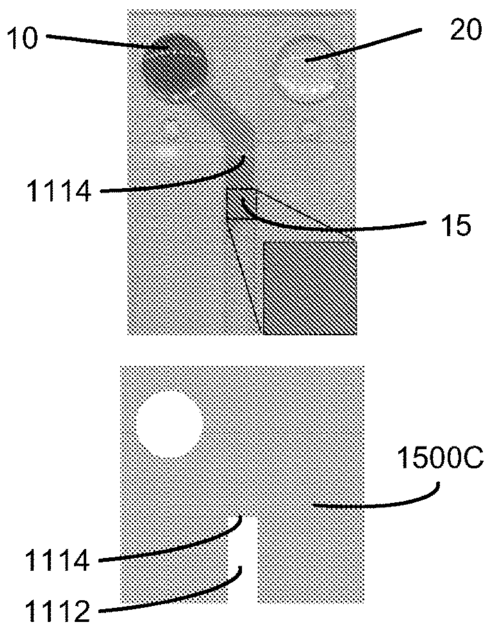

FIGS. 15A-C show three different versions of the device 1100, each having different configurations of a layer 1500A-C in which the main channel 1112 is defined. As noted above, the layers 1500A-C may correspond to the middle transparency layer 1150B shown in FIG. 11C. During testing, devices having each of the configurations illustrated in FIGS. 15A-C were fabricated. Similar to the device 1100 as illustrated in FIGS. 11A-C, each configuration illustrated in FIGS. 15A-C consisted of five layers, two inlets, and corresponding inlet channels disposed at different vertical heights within the respective device.

Referring first to FIG. 15A, the middle layer 1500A defines the main channel 1112 such that the first inlet channel 1108 and the second inlet channel 1110 do not overlap in a manner that is parallel to the main channel 1112. Stated differently, a junction 1114 where the first inlet channel 1108 and the second inlet channel 1110 meet to form the main channel 1112 is disposed at the location where the first inlet channel 1108 and second inlet channel 1110 would otherwise vertically overlap. In FIG. 15B, the layer 1500B similarly defines the main channel 1112; however, in contrast to the layer 1500A of FIG. 15A, the first inlet channel 1108 and the second inlet channel 1110 are permitted to at least partially overlap prior to the junction 1114 where the main channel 1112 begins. Similarly, the layer 15000 of FIG. 15C permits overlap of the first inlet channel 1108 and the second inlet channel 1110 prior to the junction 1114, albeit to a greater extent than that of the layer 1500B.

During testing, the configurations 1500A-C generated a non-mixed, gradient, and fully mixed flows (identified as mixed fluid 15), respectively, just after the junction 1114. Notably, each of these mix states were formed instantly when the first fluid 10 and the second fluid 20 entered the main channel 1112. To confirm the variations in mixing, flow was analyzed in a rectangular area 6 mm distance from the junction 1114 (see, e.g., FIG. 15A) of the three different configurations. Each of FIGS. 15A-C include an inset illustrating the analyzed area.

Referring to FIG. 15A, the layer 1500A, which was designed such that the fluids 10, 20 met side-by-side as they entered the main channel 1112, the fluids 10, 20 flowed without mixing. Accordingly, during testing, the test device including the layer 1500A was generally referred to as the “laminar flow” device.

The layer 1500B of FIG. 15B, on the other hand, produced a different pressure gradient across the main channel 1112 and generated a concentration gradient within the main channel 1112. For example, each of the first fluid 10 and the second fluid 20 had a relatively large amount of solution flowing through the left and right sides of the junction 1114, due to the distance difference of the flow path in inlet channels 1108, 1110. Additional testing was conducted to confirm that the linear concentration gradient across the main channel 1112 was formed immediately after the junction 1114 due to the opposite pressure gradient for the first fluid 10 and the second fluid 20. Accordingly, during testing, the test device including the layer 1500B was generally referred to as the “gradient generator” device.

Finally, the layer 15000 of FIG. 15C, in which the junction 1114 for the main channel 1112 was disposed further downstream than in the layer 1500B of FIG. 15B, resulted in a fully mixed flow of the fluids 10, 20. Structurally, a slight concentration variation occurred along the width of the main channel 1112 due to the distance difference between the left and right sides in the main channel 1112 not being equal; however, it was subsequently confirmed that the mixing ratio of the first fluid 10 to the second fluid 20 was relatively constant compared with the gradient generator device. Accordingly, during testing, the test device including the layer 15000 was generally referred to during testing as the “rapid mixer” device.

Figure 16:
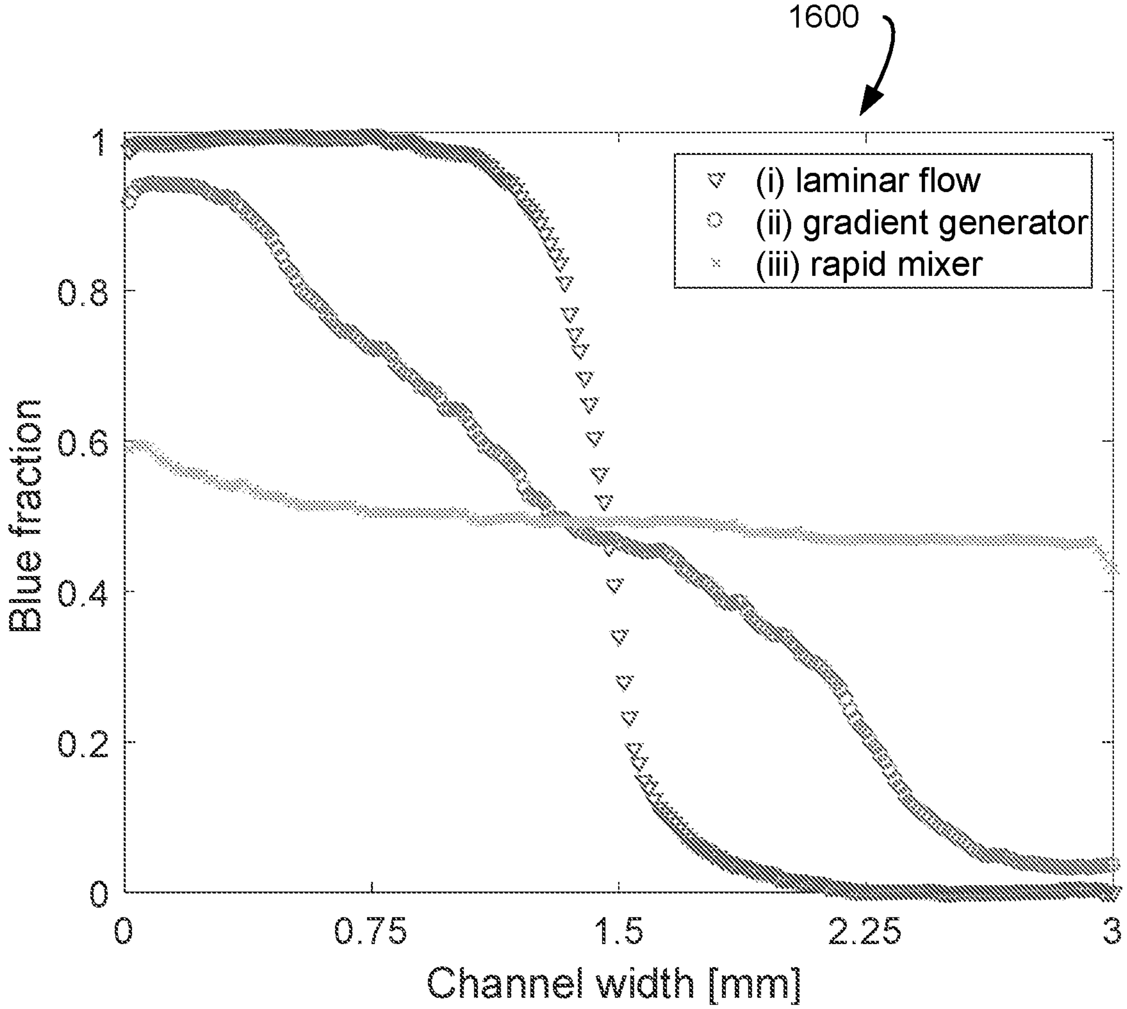
FIG. 16 is a graph illustrating results for testing of fluid mixing functionality using microfluidic devices according to the present disclosure.

FIG. 16 is a graph 1600 summarizing test results obtained for the various devices discussed above. More specifically, the graph 1600 illustrates the fraction of blue fluid (i.e., the fraction of the first fluid 10) for the different device configurations discussed above with respect to width of the main channel 1112.

Figure 17A:
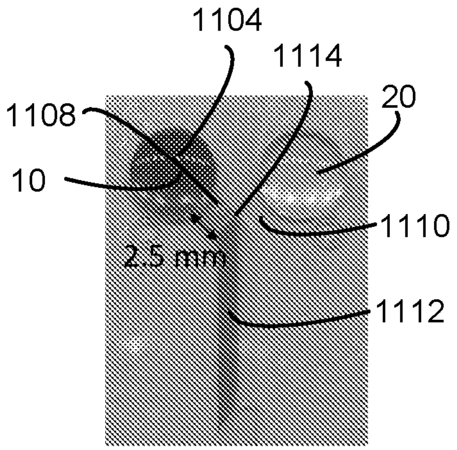
FIG. 17A-C are images of device configurations used during testing of microfluidic devices according to the present disclosure for purposes of evaluating the effects of inlet channel distance on fluid velocity.
Figure 17B:
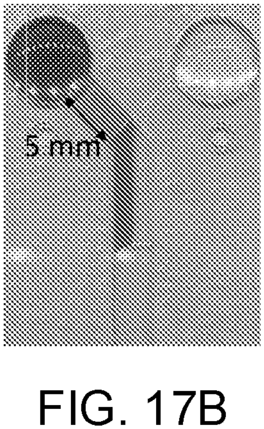
Figure 17C:
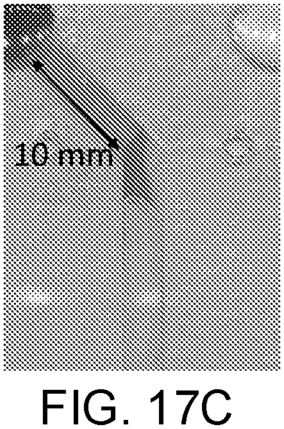

Notably, it was observed that the flow rate in the main channel 1112 may be tuned by changing the length of the inlet channels 1108, 1110. FIGS. 17A-C show images of the device 1100 with different inlet channel lengths. In particular, devices having inlet channels of three different lengths (2.5 mm, 5 mm, and 10 mm) were fabricated and tested with the inlet length being defined as the distance between the inlet (e.g., inlet 1104) corresponding to the inlet channel (e.g., inlet channel 1108) and the junction 1114 between the inlet channels (e.g., inlet channels 1108, 1110) and the main channel 1112 (all shown in FIG. 17A). All images in FIG. 17A-C were captured two seconds after the same injected volume of the first fluid 10 and the second fluid 20 entered the main channel 1112.

Figure 18A:
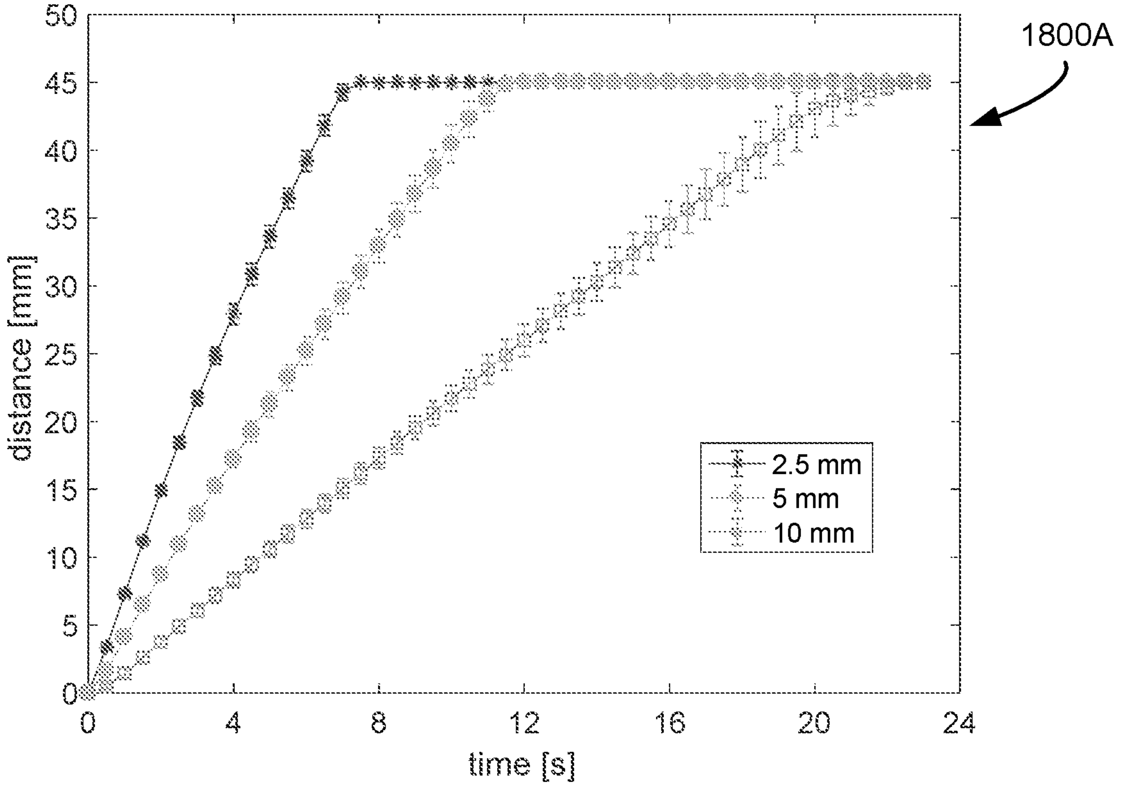
FIGS. 18A and 18B are graphs illustrating experimental results obtain during testing of microfluidic devices according to the present disclosure for purposes of evaluating the effects of inlet channel distance on fluid velocity.
Figure 18B:
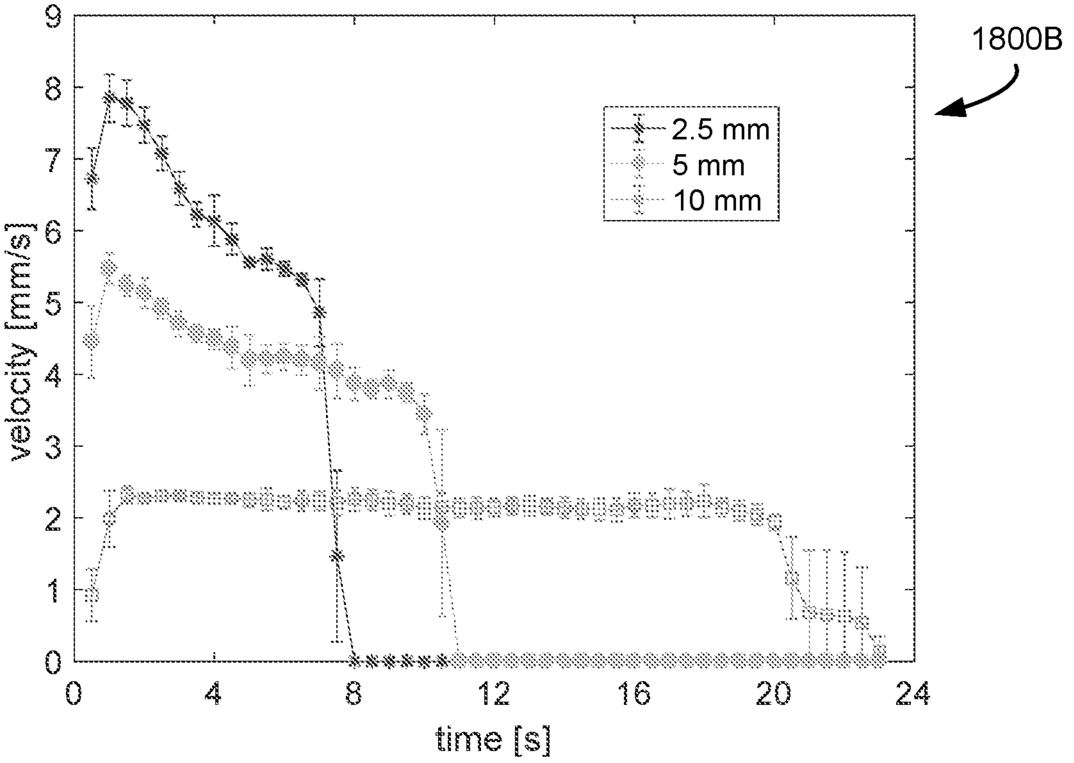

FIGS. 18A and 18B are graphs 1800A, 1800B illustrating the distance and velocity variation over time, respectively, for the different inlet lengths. As shown in FIG. 1800B, the flow velocity in the main channel 1112 increased as the inlet channel length decreased. More specifically, the 2.5 mm inlet channel device achieved a flow velocity of up to 8 mm per second, and the 10 mm inlet channel device filled all channels while maintaining a flow velocity of about 2.2 mm per second. Although the pressure drops occurring at the flow front in the main channel of all devices was the same, the short inlet channel could generate a fast flow velocity due to its low flow resistance. Interestingly, y-shape devices with this configuration do not follow Washburn characteristics describing a decreasing flow velocity with increasing flow distance in a capillary-driven device. This might be caused by the significant difference in channel height between the inlet and main channel regions.

Figure 19A:
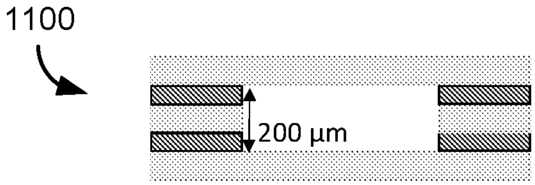
FIGS. 19A-C are cross-sectional views of microfluidic devices according to the present disclosure for purposes of evaluating the effects of main channel geometry on flow.
Figure 19B:
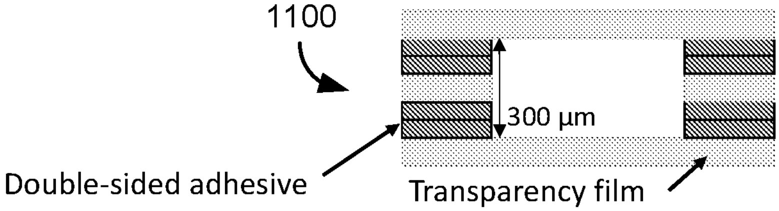
Figure 19C:
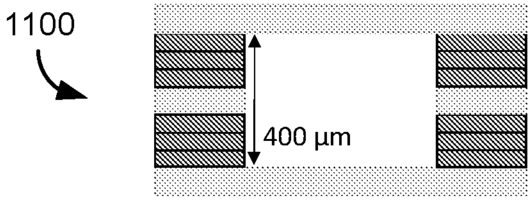

Experimental Testing—Flow Rate Variation Due to Channel Height and Fluid Properties Factors affecting the flow rate of y-shape devices fabricated by the lamination method (e.g., the device 1100 of FIGS. 11A-C) were also explored. First, the flow rate as a function of main channel heights was examined. During testing, the height of the main channel was increased by changing the number of DSA layers forming the inlet channels. For example, as the number of DSA layers between transparency film layers increased from 1 to 3, the height of the main channel increased from 200 μm to 400 μm. The foregoing design variations are shown in FIGS. 19A-C.

Figure 20:
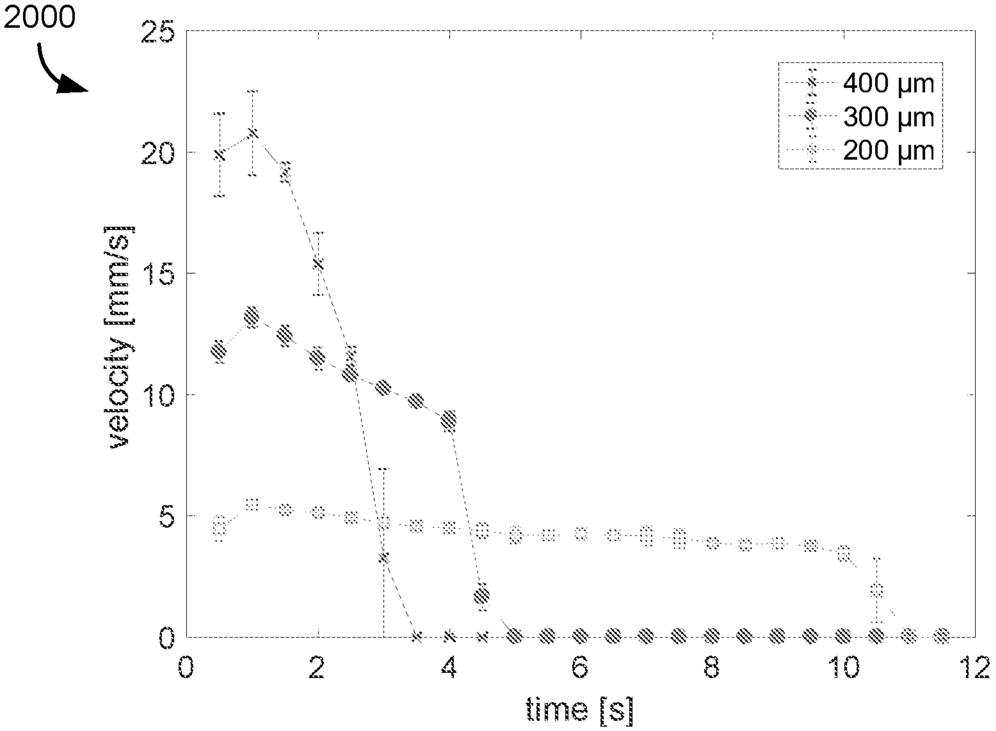
FIGS. 20 and 21 are graphs illustrating the effects of main channel geometry on flow in microfluidic devices according to the present disclosure.
Figure 21:
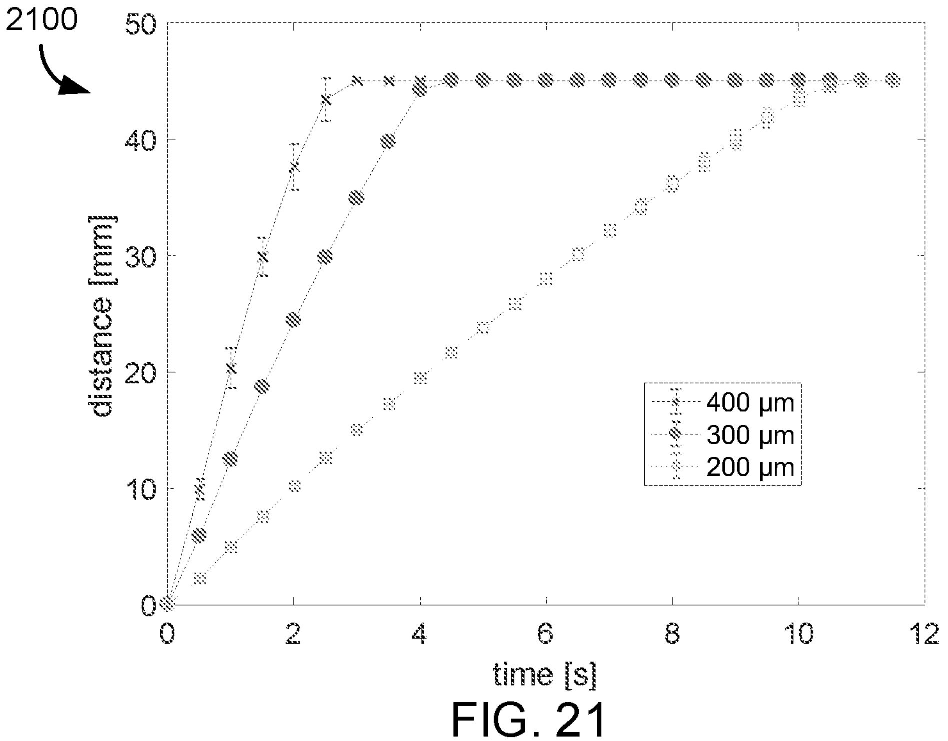

Although the height of the inlet and main channels changed, the simultaneous inflow system worked well on all devices. FIG. 20 is a graph 2000 showing the distance variation of the flow front over time in the main channel 1112, and FIG. 21 is a graph 2100 showing the flow velocity over time calculated from the distance variation result. It was confirmed that the flow rate of the y-shape device increased as the channel height increased. The 200 μm, 300 μm, and 400 μm height channels flowed 45 mm in approximately 12 seconds, 5 seconds, and 3 seconds, respectively, with maximum flow velocity of 5 mm per second, 13.5 mm per second, and 21 mm per second. After calculating the flow rate, it was confirmed that the 400 μm channel delivered more than 8 times the flow rate compared to the 200 μm channel over the same time.

Figure 22:
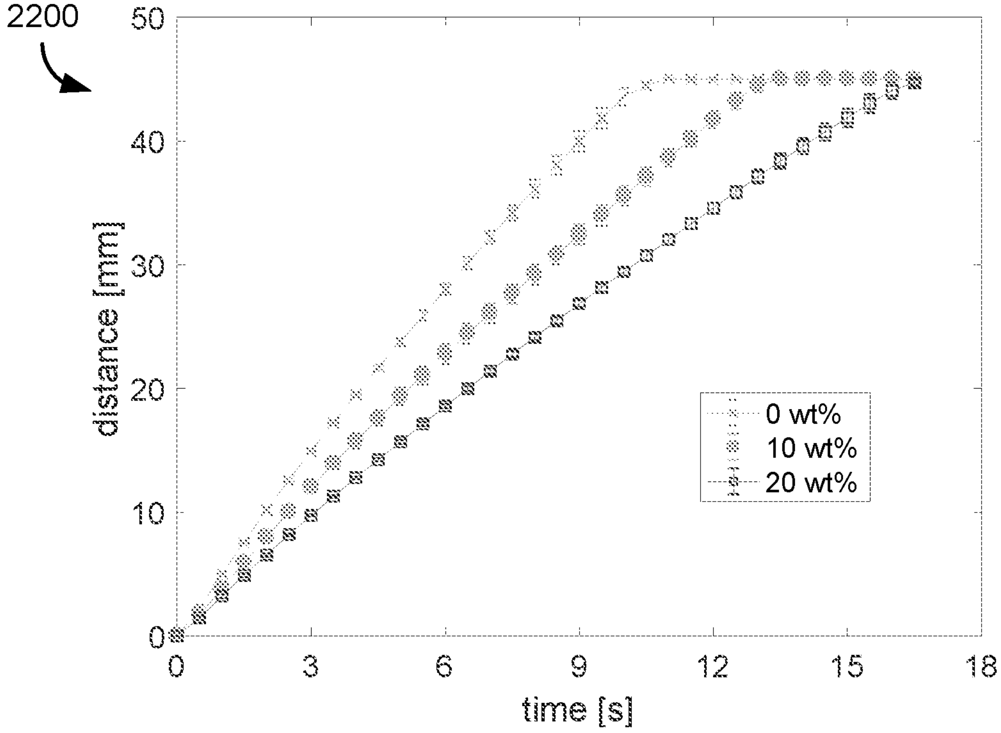
FIGS. 22 and 23 are graphs illustrating the effects of surface tension on flow in microfluidic devices according to the present disclosure.

Next, the flow rate as a function of fluid viscosity and surface tension was examined. For such testing, the laminar flow device with a main channel height of 200 μm was used. In general, as the viscosity of a fluid increases, the viscous drag due to friction with surfaces (e.g. channel surfaces in the devices discussed herein) increase and flow rate decreases. Surface tension also affects capillary force, which is the driving force of capillary flow. More specifically, as surface tension decreases, the capillary force decreases, resulting in a slower flow rate. To test the viscosity and surface tension effects, glycerin and SDS surfactant were mixed with DI-water. The viscosity and surface tension for the concentration of each added substance are shown in table 2400 of FIG. 24. For experiments, the same solution was pipetted into each inlet and the distance variation over time was measured. FIG. 22 is a graph 2200 showing the front distance versus time as a function of glycerin concentration. For glycerin concentrations of 0 wt %, 10 wt %, and 20 wt %, it took 10.6 seconds, 13.6 seconds, and 16.7 seconds, respectively to reach 45 mm, corresponding to flow rates of 2.55 $mm^3$ per second, 1.99 $mm^3$ per second, and 1.61 $mm^3$ per second, respectively. Compared with 0 wt %, the 10 wt % flow rate decreased by 22% and the 20 wt % decreased by 37%. In capillary-driven flow, the flow rate is known to be proportional to the surface tension and inversely proportional to the viscosity. The predicted decrease in flow rate due to increased viscosity is 22% and 41% respectively compared to 0 wt % case, which is similar to the actual experimental value.

Figure 23:
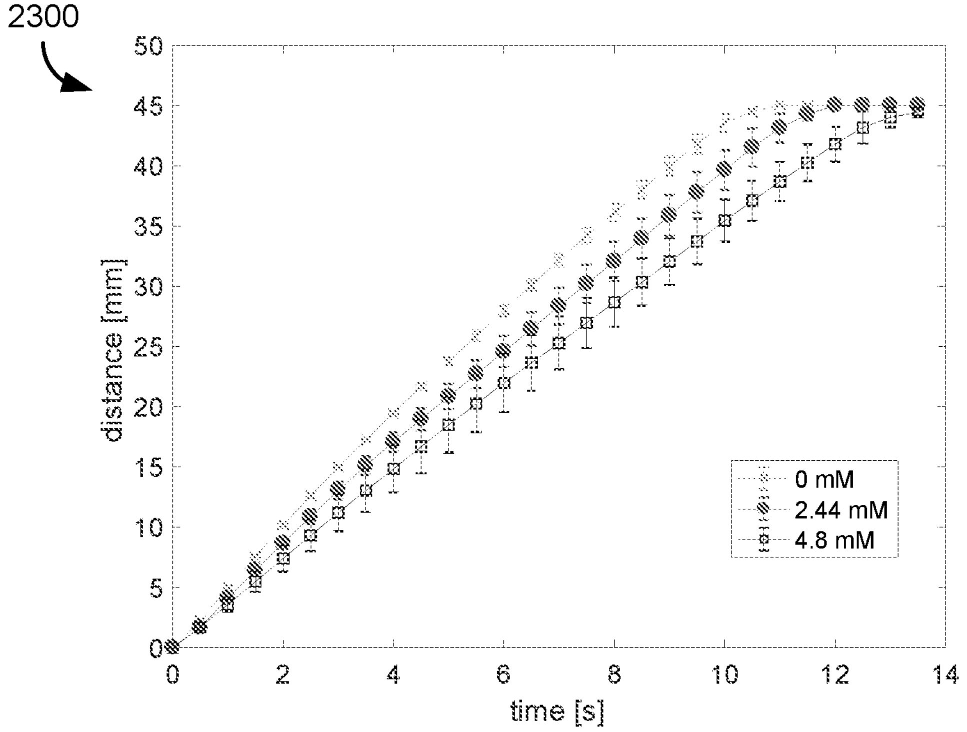

FIG. 23 is a graph 2300 illustrating the front distance over time as the SDS concentration of the solution increases. The surface tension for each case of SDS concentration is 72 mN/m, 60 mN/m, and 50 mN/m and the average flow rate was 2.55 $mm^3$ per second, 2.25 $mm^3$ per second, and 1.94 $mm^3$ per second, respectively. The flow rate change due to decreasing surface tension follows a similar trend to the increase in viscosity. In addition to changing the surface tension and viscosity individually, we also determined the impact of changing the viscosity and surface tension simultaneously. Table 2500 of FIG. 25 shows the average flow rate at 45 mm for each glycerin/SDS concentration. Here, flow rates are independently affected by viscosity and surface tension and the flow rate decreases as the viscosity increases and the surface tension decreases. Therefore, to design the capillary-driven flow device made of film and to control the flow rate, the viscosity and surface tension of the fluid used should be considered.

Various modifications and additions can be made to the exemplary implementations discussed without departing from the scope of the present invention. For example, while the implementations described above refer to particular features, the scope of this invention also includes implementations having different combinations of features and implementations that do not include all of the described features. Accordingly, the scope of the present invention is intended to embrace all such alternatives, modifications, and variations together with all equivalents thereof.

We claim:

1. A microfluidic device comprising:

a device body defining a microfluidic pathway, the microfluidic pathway including:
- a first channel,
- a second channel downstream of the first channel, and
- a junction including a transition between the first channel and the second channel, the transition to inhibit fluid entering the transition from the first channel from forming a meniscus across the second channel, thereby inhibiting capillary-driven flow into the second channel;

a valve that, when activated while capillary-driven flow of the fluid is inhibited at the transition, induces capillary-driven flow through the second channel by facilitating formation of the meniscus;

wherein the fluid entering the transition from the first channel is a first fluid, the valve includes a plurality of valve channels defined by the device body, each of the plurality of valve channels in communication with the junction, the valve is activated by providing one or more second fluids through the plurality of valve channels such that each of the one or more second fluids reach the junction, and the meniscus is a combined meniscus formed by combination of the first fluid and each of the one or more second fluids at the junction, the valve facilitating formation of the combined meniscus by delivering each of the one or more second fluids to the junction.

2. The microfluidic device of claim 1, wherein:

the valve includes an inwardly deformable portion downstream of the transition, the valve is activated by depressing and subsequently releasing the inwardly deformable portion, and releasing the inwardly deformable portion induces a pressure reduction downstream of the transition, the pressure reduction to draw fluid from the first channel across the transition to form the meniscus.

3. The microfluidic device of claim 1, wherein:

the valve includes a valve portion upstream of the transition, the valve is activated by manipulating the valve portion, and manipulating the valve portion induces a pressure increase upstream of the junction, thereby pushing the fluid from the first channel across the transition to form the meniscus when the fluid is inhibited.

4. The microfluidic device of claim 1, wherein:

the valve includes a valve portion having an inner surface, and the valve is activated by manipulating the valve portion while capillary-driven flow of the fluid is inhibited at the transition such that the inner surface contacts the fluid while the fluid is inhibited.

5. The microfluidic device of claim 1, wherein:

the device body is formed from a plurality of laminated layers, the first channel is defined by a first set of layers of the plurality of laminated layers, and the second channel is defined by a second set of layers of the plurality of laminated layers, the second set of layers having a greater cross-sectional area than the first set of layers.

6. The microfluidic device of claim 1, wherein:

the device body is formed from a plurality of laminated layers, the first channel is defined by a first set of layers of the plurality of laminated layers, the second channel is defined by a second set of layers of the plurality of laminated layers, and the second set of layers is a proper superset of the first set of layers.

7. The microfluidic device of claim 1, wherein:

the device body is formed from a plurality of laminated layers, the first channel is defined by a first set of layers of the plurality of laminated layers, the valve includes a valve channel in communication with the junction and defined by a second set of layers of the plurality of laminated layers and in communication with the junction, the fluid entering the transition from the first channel is a first fluid, the valve is activated by providing a second fluid through the valve channel such that the second fluid reaches the junction and contacts the first fluid, the meniscus is a combined meniscus formed by combination of the first fluid and the second fluid at the junction, the valve facilitating formation of the combined meniscus by delivering the second fluid to the junction, and a portion of the valve channel immediately upstream of the junction extends parallel to a portion of the first channel immediately upstream of the junction.

8. A microfluidic device comprising:

a device body formed from laminated layers, the laminated layers defining a microfluidic pathway, the microfluidic pathway including:

a first channel defined by a first set of layers of the laminated layers, a second channel downstream of the first channel and defined by a second set of layers of the laminated layers, and a junction including a transition between the first channel and the second channel, the transition to inhibit fluid entering the transition from the first channel from forming a meniscus across the second channel, thereby inhibiting capillary-driven flow into the second channel; and a valve that, when activated while capillary-driven flow of the fluid is inhibited at the transition, induces capillary-driven flow through the second channel by facilitating formation of the meniscus;

wherein the fluid entering the transition from the first channel is a first fluid, the valve includes a plurality of valve channels defined by the device body, each of the plurality of valve channels in communication with the junction, the valve is activated by providing one or more second fluids through the plurality of valve channels such that each of the one or more second fluids reach the junction, and the meniscus is a combined meniscus formed by combination of the first fluid and each of the one or more second fluids at the junction, the valve facilitating formation of the combined meniscus by delivering each of the one or more second fluids to the junction.

9. The microfluidic device of claim 8, wherein:

the plurality of valve channels in communication with the junction are defined by a third set of layers of the laminated layers and in communication with the junction.

10. The microfluidic device of claim 8, wherein the valve includes a deformable portion of the device body that, when at least one of depressed or released, induces a change in pressure along the microfluidic pathway such that the change in pressure results in the fluid being delivered into the second channel to form the meniscus when capillary-driven flow of the fluid is inhibited at the transition.

* * * * *